(12) United States Patent
Talamini, Sr.

(10) Patent No.: US 6,347,760 B1
(45) Date of Patent: Feb. 19, 2002

(54) DEVICE FOR STORING OPTICAL FIBERS

(75) Inventor: Victor J. Talamini, Sr., Asbury, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/317,643

(22) Filed: May 25, 1999

(51) Int. Cl.[7] ............................ B65H 75/38; G02B 6/00
(52) U.S. Cl. ......................... 242/388; 385/134; 385/135
(58) Field of Search ........................... 242/388, 388.6, 242/398, 399, 400.1, 405.1, 395, 591, 129, 166, 171, 222; 385/88–92, 94, 134, 135, 136, 137, 123

(56) References Cited

U.S. PATENT DOCUMENTS

| | | | |
|---|---|---|---|
| 1,600,482 A | 9/1926 | Nuhring | 242/399 X |
| 2,601,960 A | 7/1952 | Hick | 242/129.6 |
| 3,014,336 A | 12/1961 | Henry | 242/166 |
| 3,371,885 A | 3/1968 | Douglas | 242/129 |
| 3,491,967 A | 1/1970 | Sawyer et al. | 242/129 |
| 4,330,005 A | 5/1982 | Kjarsgaard | 137/355.28 |
| 4,340,193 A | 7/1982 | Zitzman | 242/129.72 |
| 4,384,688 A | 5/1983 | Smith | |
| 4,664,260 A | 5/1987 | Stokes | 206/386 |
| 4,715,549 A | 12/1987 | Travlos | |
| 4,765,560 A | 8/1988 | Branback | 242/129 |
| 4,768,732 A | 9/1988 | Greenleaf | |
| 4,786,213 A | 11/1988 | Leppanen | 405/303 |
| 4,796,939 A | 1/1989 | Symonds et al. | 294/67.1 |
| 4,826,100 A | 5/1989 | Belliveau | 242/129 |
| 4,844,376 A | 7/1989 | Marman, Sr. | 242/129 |
| 4,846,343 A * | 7/1989 | Rupert | 242/129 |
| 4,856,729 A | 8/1989 | Maraman | 242/129 |
| 4,861,134 A | 8/1989 | Alameel et al. | 350/96.2 |
| 4,886,336 A | 12/1989 | Deusser | 350/96.2 |
| 4,913,365 A | 4/1990 | Shamas | 350/96.2 |
| 5,078,332 A | 1/1992 | Carter | 242/129 |
| 5,193,758 A | 3/1993 | Laager et al. | |
| 5,245,687 A | 9/1993 | Usui | 385/134 |
| 5,320,301 A | 6/1994 | Cross | 242/129 |
| 5,348,241 A | 9/1994 | Huette | 242/597.5 |
| 5,402,515 A | 3/1995 | Vidacovich et al. | 385/135 |
| 5,519,804 A | 5/1996 | Burek et al. | 385/135 |
| 5,642,455 A | 6/1997 | Divita et al. | 385/128 |
| 5,651,510 A | 7/1997 | Ebele et al. | 242/395 |
| 5,668,909 A * | 9/1997 | Mozzati | 385/134 |
| 5,668,910 A | 9/1997 | Arnett | 385/134 |
| 5,703,990 A * | 12/1997 | Robertson et al. | 385/135 |
| 5,790,740 A | 8/1998 | Cloud et al. | 385/135 |
| 5,796,908 A * | 8/1998 | Vicory | 385/135 |
| 5,909,298 A | 6/1999 | Shimada et al. | 359/163 |
| 5,915,061 A * | 6/1999 | Vanoli | 385/135 |
| 5,917,983 A | 6/1999 | Page et al. | 385/134 |
| 5,996,930 A | 12/1999 | Katayama et al. | 242/593 |
| 6,076,755 A * | 6/2000 | Talamini, Sr. | 242/129 |

\* cited by examiner

Primary Examiner—William A. Rivera

(57) ABSTRACT

A device for storing at least one fiber can include at least two of the following components: a separator, a plurality of lifters, and a secluder. The separator can separate a first fiber portion from a second fiber portion of a fiber. The separator can define at least one inner bearing surface adapted to restrain the first fiber portion from straightening when coiled within the separator, and at least one outer bearing surface that can be adapted to limit a path defined by the second fiber portion when coiled on the separator. The path can vary with a longitudinal tension in the second fiber portion, and can have a plurality of curves each having a radius. The radius of each curve of the path can at least meet a reliability-adjusted minimum bending radius of the second fiber portion. The separator can also define at least one separator opening adapted for passing the fiber therethrough. The plurality of lifters can move a plurality of fibers parallel to a spooling axis around which the fibers are spooled. The plurality of lifters can be adapted to be disposed beneath at least a bottom-most fiber and adapted to be movable parallel to the spooling axis. The seclude can segregate a plurality of fibers coiled within a space defined by a restrainer, can be adapted to be bound by the restrainer and can lack a sealer.

87 Claims, 19 Drawing Sheets

DEVICE FOR STORING OPTICAL FIBERS

CROSS-REFERENCES TO RELATED APPLICATIONS

This invention relates to the following co-pending applications, which are incorporated by reference:

"Device for Separating Portions of Spooled Optical Fibers", Ser. No. 09/317,827, filed May 25, 1999;

"Device for Moving a Spooled Stack of Optical Fibers", Ser. No. 09/317,977, filed May 25, 1999, now U.S. Pat. No. 6,076,755, issued Jun. 20, 2000;

"Device for Segregating Optical Fibers", Ser. No. 09/317, 826, filed May 25, 1999, now abandoned.

FIELD OF THE INVENTION

The present invention relates to the field of optical fiber storage systems.

BACKGROUND OF THE INVENTION

In a submarine optical transmission system, optical signals transmitted through the submarine optical fiber cable become attenuated over the length of the cable, which may stretch thousands of miles. To compensate for this signal attenuation, optical repeaters are strategically positioned along the length of the cable.

FIG. 1 illustrates a perspective view of a typical submarine optical repeater 10 having a cylindrical housing 12. A first submarine optical cable 16 enters repeater 10 at first end cover 14 and connects to first internal optical cable 18, which, in turn, connects to an optical repeater assembly 20. Optical repeater assembly 20 typically includes at least the following items (not shown in FIG. 1): optical components, connecting optical fibers, electronic circuits, and connecting wiring. Optical repeater assembly 20 connects via a second internal optical cable 19 to a second submarine optical cable 17, which exits repeater 10 at second end cover 15.

Typically, the optical fibers found within optical repeaters are circular in cross-section, and are constructed of glass surrounded by a protective jacket that is thicker than the glass. For example, a typical glass fiber ("glass fiber", "bare fiber", or "unjacketed fiber") can have an outer diameter of approximately 0.010 inches, and a typical jacketed fiber can have an outer diameter of approximately 0.040 to 0.060 inches.

The glass fiber is fragile. Because even microscopic damage to the glass fiber can adversely affect the reliability of the optical repeater (and, as a result, the reliability of the entire submarine optical fiber cable system), great efforts are normally taken to protect the glass fiber from damage. Generally, the likelihood of damage to the glass fiber can be reduced by ensuring that any curvature in the glass fiber meets or exceeds the minimum bending radius of the glass fiber. However, the minimum bending radius of the glass fiber is a function of the expected life of the glass fiber. For example, when at least a 25-year life is expected, the glass fiber typically has a minimum bending radius of approximately 1 inch. This is referred to as the reliability-adjusted minimum bending radius of the glass fiber, because meeting or exceeding this value provides acceptable reliability from bending damage during the expected life of the glass fiber.

Typically, the optical components found within optical repeaters are manufactured with a segment of optical fiber attached at each end and cut to a specified length. Each fiber segment contains a jacketed portion of specified length located adjacent to the optical component, and a bare portion of specified length extending from the opposite end of the jacketed portion. The bare portion is spliced into the bare portion of another segment in the repeater's optical circuit. Creating these splices can be a complicated task, requiring substantial lengths of bare fiber on each side of the splice. Optimally however, the repeater is designed to be as space-efficient as possible, thereby minimizing its production, storage, shipping, and installation costs. Thus, it is desirable to store each optical fiber segment in the most space-efficient manner possible.

FIG. 2 illustrates a perspective view of a known fiber storage device that can be located within, for example, a submarine optical repeater or branching unit. Tray 42 includes generally circular portal spool 44 which is surrounded by generally square portal well 48. The square portal well includes a fiber portal 68. Tray 42 also includes generally circular storage spool 46 which is surrounded by generally square storage well 50. Optical device 54 is mounted to tray 42 in optical cavity 52 which is connected to storage well 50 by cavity-to-storage channel 58 and by storage-to-cavity channel 64. Optical cavity 52 is connected to portal well 58 by portal-to-cavity channel 72 and cavity-to-portal channel 66.

Optical device 54 is connected to jacketed storage fiber 56 at the end of optical device 54 nearest storage well 50. Just inside storage well 50, jacketed storage fiber 56 connects to bare storage fiber 59. The end of bare storage fiber 59 is spliced to the end of bare connecting fiber 60 at splice 74. Bare connecting fiber 60 extends from splice 74 to jacketed connecting fiber 62 which, in turn, extends through storage-to-cavity channel 64, through optical cavity 52, through device-to-portal cavity 66, and into portal well 48. Within portal well 48, jacketed connecting fiber 62 wraps around portal spool 44 and exits at portal 68.

Jacketed connecting fiber 70 exits from the opposite end of optical device 54 and extends through portal-to-cavity channel 72, and into portal well 48, where it wraps around portal spool 44 and exits at portal 68. Spools 44 and 46 are designed with a radius greater than or equal to the reliability-adjusted minimum bending radius of the bare portion of fibers 56 and 60.

Although not shown, tray 42 can define more than one optical cavity and accompanying channels. In that situation, each additional optical fiber of any additionally mounted optical devices is routed and stored similarly to fibers 56, 59, 60, 62, and 70, i.e., in the channels connected to their respective optical cavity and around their respective spools. When more than one fiber is to be spooled around either spool 44 or 46, each additional fiber is wrapped around the spool generally above the preceding fibers, thereby forming a stack of spooled fibers.

Absent a late-stage design modification, jacketed fibers are generally not allowed to substantially intrude into the well where bare fiber is spooled, because such an intrusion can cause a jacketed fiber to press against or be spooled with a bare fiber. This is disadvantageous because the diameter of the jacketed fiber is much smaller than the reliability-adjusted minimum bending radius of the bare fiber. Thus, if the bare fiber is bent against the jacketed fiber, a violation of the minimum bending radius of the bare fiber can result, potentially causing unacceptable mechanical stresses in the bare fiber. Such a situation is particularly likely when a number of spooled bare fibers are stacked on a spool, and each fiber must be pushed down into the well to make room for the successive fibers, the pushing action thereby greatly increasing the forces bending the bare fiber around the intruding jacketed fiber.

When intrusion is unavoidable, the jacketed portion may only extend into the well when the well has sufficient space to prevent the intruding jacketed portion from contacting the spooled bare portion. This means that the jacketed portion may typically intrude into the well by no more than about 1 inch. If the jacketed portion will intrude by more than about 1 inch, the tray design, or more typically the optical component design, should be modified to avoid damage to the bare fibers. However, when design changes substantially affect fiber portion lengths, other difficulties can ensue.

Changes in the length of the bare fiber portion can sometimes be accommodated by adjusting the amount of bare fiber wound around the spool, or adjusting how tightly the bare fiber is wound around the spool. However, an increase of more than 1 inch in the length of the jacketed fiber portion typically requires a change to the optical component's manufacturing specification, because, as discussed previously, such an increase could cause the jacketed fiber to intrude excessively into the bare fiber storage area. Likewise, a decrease in the jacketed fiber's length could cause the bare fiber to be stored, unprotected, in a fiber channel, where it could be scratched by contact with the channel, or could be bent against an edge of the channel or another jacketed fiber.

As previously discussed, these types of situations could expose the bare fiber, and potentially the entire submarine optical fiber cable system, to unacceptable damage. Thus, changes in the length of the jacketed fiber portion often require a change to the optical component's manufacturing specification. Such specification changes are typically very costly, particularly if initiated after the manufacturer has begun producing the optical component.

Thus, there is a need for a device that allows jacketed fiber and bare fiber to be stored in a protective, space-efficient, and separate manner, and that accommodates substantial changes to the length of jacketed fiber after the storage tray has been designed, and particularly after optical components have been specified and ordered.

However, this is not the only disadvantage to the known fiber storage devices. Accessing a bare fiber stored in the known fiber storage devices can be challenging. For example, assume that four bare fibers are spooled in a stacked manner around the same spool, and that access to the bottom-most fiber in the stack is required. However, because the well is very compact, it is difficult for the assembler's fingers to reach therein, particularly when the well is more than a fraction of an inch in depth, as it typically is. Also, because the bare fibers are very small in diameter, each bare fiber can be very difficult to grab. Thus, a pointed stick is typically used to select a bare fiber and slide it to the top of well where it can be grasped. Then, the bare fiber is unspooled and moved out of the way, and the process repeated until the desired fiber is obtained. However, using a stick in this manner is a clumsy endeavor, and can cause scratches or other mechanical damage to the bare fibers. Thus, there is a need to provide an improved device for moving each spooled fiber within a fiber storage device.

There are also disadvantages with the known assembly for segregating bare fibers. To facilitate segregating two or more bare fibers that have been wrapped around a spool and within a well, a multi-envelope assembly is typically assembled around the spool and within the well. A known multi-envelope assembly includes a single envelope bottom, a plurality of envelope liners, a plurality of envelope tops, and optionally, one or more corner protectors.

FIG. 3 illustrates a top view of envelope bottom 100. Envelope bottom 100 is a single layer of white opaque fibrous paper, such as that bearing the TYVEK® brand. Envelope bottom 100 has foldable sealing flaps 102 along three of its four outer sides. When sealing flaps 102 are folded upwards, envelope bottom 100 is generally square in shape, thereby corresponding to the generally square walls of the well. To provide a partial sealing flap yet allow a fiber to enter and exit, along the fourth side of envelope bottom 100 are three foldable side tabs 108. Corresponding to the generally circular spool, bottom 100 has a generally circular opening 104, into which extend four, foldable short inner tabs 106, and four, foldable long inner tabs 107 which are equally spaced circumferentially. Short inner tabs 106 are located along imaginary diagonal lines that connect the corners of bottom 100. Long inner tabs 107 are located along imaginary lines that perpendicularly bisect and connect the sides of bottom 100.

Envelope bottom 100 fits snugly around the spool and within the well, such that sealing flaps 102 and side tabs 108 fold up along the walls of the well, and inner tabs 106 and 107 fold up along the outer circumference of the spool.

A top view of envelope liner 110 is illustrated in FIG. 4. Like envelope bottom 100, envelope liner 110 is a single layer of white opaque fibrous paper, such as that bearing the TYVEK® brand. Moreover, envelope liner 110 is nearly identical in shape and size to envelope bottom 100, except that liner 110 does not have any tabs corresponding to the four, foldable long inner tabs 107, and only has two side tabs rather than the three of envelope bottom 100. Thus, envelope liner 110 has foldable sealing flaps 112 along three sides, and two foldable side tabs 118 along its fourth side. Corresponding to the spool, liner 110 also includes a roughly circular opening 114, into which extend four, foldable inner tabs 116 that are equally spaced circumferentially around opening 114.

Envelope liner 110 also fits snugly around the spool, around the long inner tabs of bottom 100, and within the well, such that flaps 112 and side tabs 118 fold up along the walls of the well, and inner tabs 116 fold up along the outer circumference of the spool.

FIG. 5 provides a top view of envelope top 120. Envelope top 120 is approximately square, with a circular opening 124 that corresponds to the spool. Like envelope bottom 100 and envelope liner 110, envelope top 120 is constructed of a white opaque fibrous paper, such as that bearing the TYVEK® brand. However, envelope top 120 is constructed of a dual-layer paper having a bottom layer coated with an adhesive, and a top layer releasably joined via that adhesive to the bottom layer.

Along three sides, envelope top 120 has pre-perforated flap sealing zones 122, the top layer of which can be removed leaving corresponding adhesive zones for receiving sealing flaps 112 from liner 110, or sealing flaps 102 from bottom 100. Along its fourth side, envelope top 120 has pre-perforated side tab sealing zones 128, the top layer of which can be removed leaving corresponding adhesive zones for receiving side tabs 118 from liner 110, or side tabs 108 from bottom 100. Evenly spaced around circular edge 124 are four, pre-perforated short inner tab sealing zones 126, the top layer of which can be removed leaving corresponding adhesive sealing zones for receiving inner tabs 116 from liner 110, or inner tabs 106 from bottom 100.

Referring to FIG. 6, a corner protector 130 is illustrated. Corner protector 130 serves to protect the spooled bare fiber within a well when the jacketed portion of the fiber extends slightly (less than 1 inch) into the well. Corner protector 130 is placed over the corner nearest the protruding jacketed fiber. Folding flap 132 folds alongside the wall of the well. Arcuate edge 134 is placed adjacent to the spool.

FIG. 7 illustrates a cross-sectional view of a known multi-envelope assembly 90. Referring to FIG. 7, multi-envelope assembly 90 is adapted to be used on a fiber storage tray 80 having an elongated square well 82 surrounding an elongated circular spool 84. Multi-envelope assembly 90 is constructed of a single base envelope 92, followed by a plurality of standard envelopes 94. Base envelope 92 is constructed using a single envelope bottom 100 and a single envelope top 120. Standard envelope 94 is constructed using a single envelope liner 110 and a single envelope top 120. Long inner tabs 107 of envelope bottom 100 tie base envelope 92 to a plurality of standard envelopes 94 to form multi-envelope assembly 90.

More specifically, multi-envelope assembly 90 is assembled as follows:

1) obtain envelope bottom 100 and fold upwards each of flaps 102, side tabs 108 (not shown in FIG. 7), short inner tabs 106, and long inner tabs 107;
2) place envelope bottom 100 around spool 84 and within well 82, such that long inner tabs 107 extend along the outer wall of spool 84;
3) spool a first fiber 88 around spool 84 and within well 82;
4) obtain envelope top 120 and remove the top layer covering each of flap sealing zones 122, side tab sealing zones 128 (not shown in FIG. 7), and short inner tab sealing zones 126;
5) place envelope top 120 over spool 84 such that side tab sealing zones 128 (not shown in FIG. 7) align with side tabs 108 (not shown in FIG. 7) of bottom 100;
6) place envelope top 120 around spool 84 and within well 82, such that long inner tabs 107 extend along the outer wall of spool 84 and above envelope top 120;
7) gently fold and press the each of the following elements of envelope bottom 100 onto their respective sealing zones of envelope top 120 to partially seal base envelope 92:
   sealing flaps 102 onto flap sealing zones 122;
   side tabs 108 (not shown in FIG. 7) onto side tab sealing zones 128 (not shown in FIG. 7); and
   inner short tabs 106 onto short inner tab sealing zones 126.

At this point, base envelope 92 has been assembled. Next, a standard envelope 94 is constructed and attached to base envelope 92 as follows:

8) obtain an envelope liner 110 and fold upwards each of flaps 112, side tabs 118 (not shown in FIG. 7), and short inner tabs 116;
9) place envelope liner 110 around spool 84 and within well 82, such that long inner tabs 107 of bottom 100 continue to extend along the outer wall of spool 84;
10) spool another fiber 88 around spool 84 and within well 82;
11) obtain envelope top 120 and remove the top layer covering each of flap sealing zones 122, side tab sealing zones 128 (not shown in FIG. 7), and short inner tab sealing zones 126;
12) place envelope top 120 over spool 84 such that side tab sealing zones 128 (not shown in FIG. 7) align with side tabs 118 (not shown in FIG. 7) of liner 110;
13) place envelope top 120 around spool 84 and within well 82, such that long inner tabs 107 of envelope bottom 100 continue to extend along the outer wall of spool 84 and above envelope top 120;
14) gently fold and press the each of the following elements of envelope liner 110 onto their respective sealing zones of envelope top 120 to partially seal standard envelope 94:
   flaps 112 onto flap sealing zones 122;
   side tabs 118 (not shown in FIG. 7) onto side tab sealing zones 128 (not shown in FIG. 7); and
   inner short tabs 116 onto short inner tab sealing zones 126.

Steps 8 through 14 are repeated as necessary to construct additional standard envelopes 94 to accommodate all the bare fibers 88. Once the last standard envelope 94 has been assembled, the following steps are taken to finalize multi-envelope assembly 90:

15) fold long inner tabs 107 of bottom 100 over top 120 and away from spool 84;
16) install a cover (not shown) over fiber storage tray 80.

The adhesion of flaps 102, side tabs 108 (not shown in FIG. 7), and inner tabs 106 to their respective sealing zones seals bottom 100 to top 120, thereby forming base envelope 92. Likewise, the adhesion of flaps 112, side tabs 118 (not shown in FIG. 7), and inner tabs 116 to their respective sealing zones seals liner 110 to top 120, thereby forming standard envelope 94. The folding of long inner tabs 107 over top 120 and away from spool 84 assists in preventing any fiber 88 from laying across the top of spool 84, and links base envelope 92 and each standard envelope 94 into multienvelope assembly 90.

However, there are numerous disadvantages to multi-envelope assembly 90. The pressing required to adhere flaps and tabs to the sealing zones of envelope top 120 can cause unacceptable forces to be applied to the fibers and splices contained below. Moreover, the folding of flaps and tabs, and the pressing required to adhere flaps and tabs is very time-consuming. Furthermore, the need for flaps extending along nearly the entirety of the length of each edge of both envelope bottom 100 and envelope liner 110 strongly militates in favor of the well being a square, or at most a regular polygon having a relatively small number of sides. However, a square well can limit the well entry locations and angles for a fiber or its channel, thus substantially constraining the geometry of the storage tray.

There are additional disadvantages to multi-envelope assembly 90. For example, accessing a bare fiber stored in multi-envelope assembly 90 can be challenging and risky to the integrity of the fiber. Once the desired envelope has been removed from the well, each of the flaps and tabs must be pried free from envelope top 120, potentially exposing the bare fiber and the splice to unacceptably high mechanical stresses. Moreover, because multi-envelope assembly 90 is opaque, determining the location of the bare fiber and the splice is particularly difficult, thus increasing the difficulty of avoiding the application of prying stresses to the bare fiber or splice.

SUMMARY OF THE INVENTION

Embodiments of the present invention can provide a device for storing at least one fiber. Each of the embodiments of the present invention can include embodiments of at least two of the following components: a separator, a plurality of lifters, and a secluder.

Embodiments of the separator can separate a first fiber portion from a second fiber portion of a fiber. The separator can define at least one inner bearing surface adapted to restrain the first fiber portion from straightening when coiled within the separator. The separator can also define at least one outer bearing surface that can be adapted to limit a path defined by the second fiber portion when coiled on the separator. The path can vary with a longitudinal tension in the second fiber portion. The path can have a plurality of curves each having a radius. The radius of each curve of the path can at least meet a reliability-adjusted minimum bending radius of the second fiber portion. The separator can also define at least one separator opening adapted for passing the fiber therethrough.

Embodiments of the plurality of lifters can move a plurality of fibers parallel to a spooling axis around which the fibers are spooled. The plurality of lifters can be adapted to be disposed beneath at least a bottom-most fiber from the plurality of fibers and adapted to be movable parallel to the spooling axis.

Embodiments of the secluder can segregate a plurality of fibers coiled within a space defined by a restrainer. The secluder can be adapted to be bound by the restrainer. The secluder can lack a sealer.

BRIEF DESCRIPTION OF THE DRAWINGS

The invention will be more readily understood through the following detailed description, with reference to the accompanying drawings, in which.

DETAILED DESCRIPTION

Introduction

Figure 1:
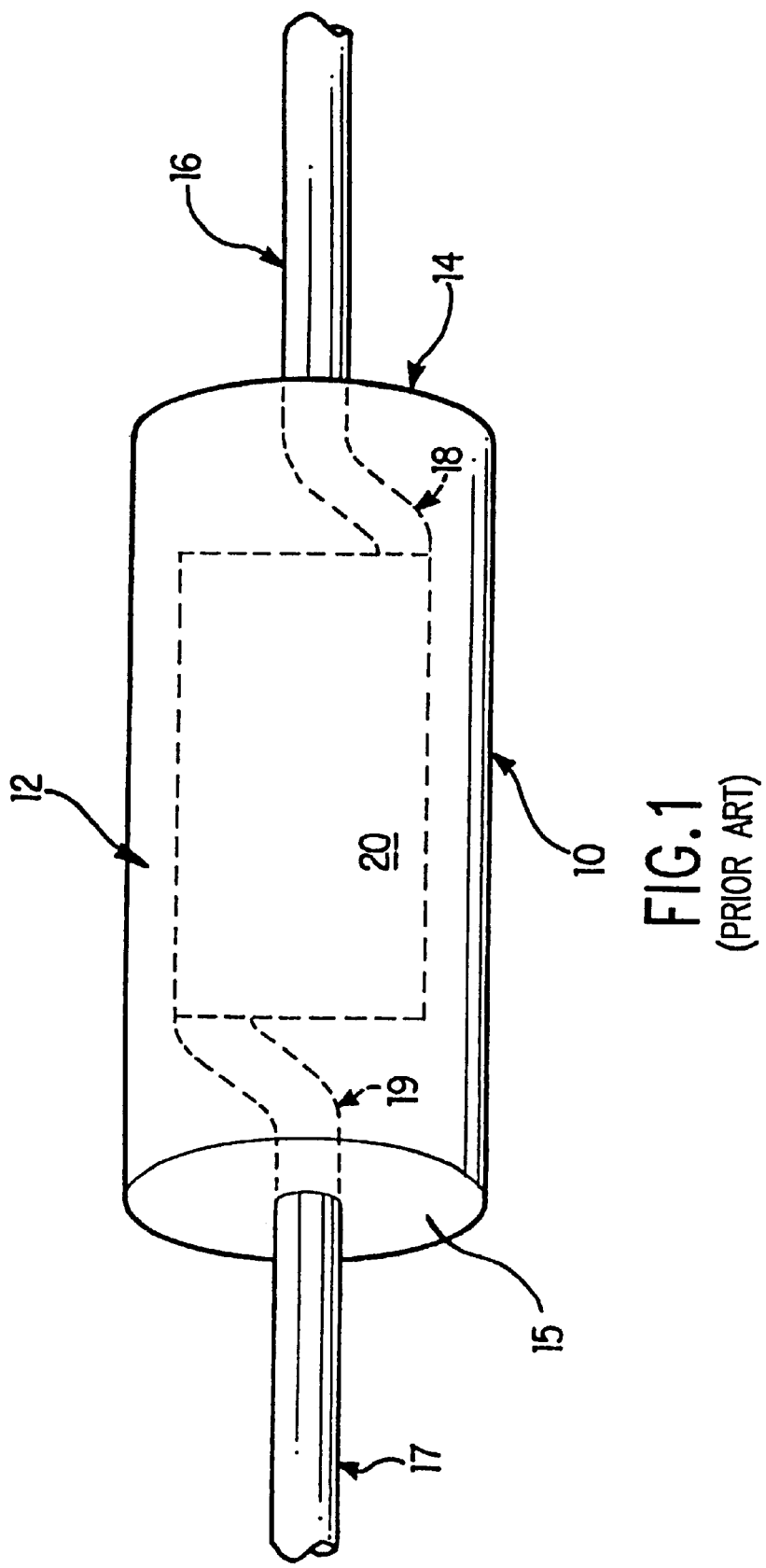
FIG. 1 is a perspective view of a known submarine optical repeater.
Figure 2:
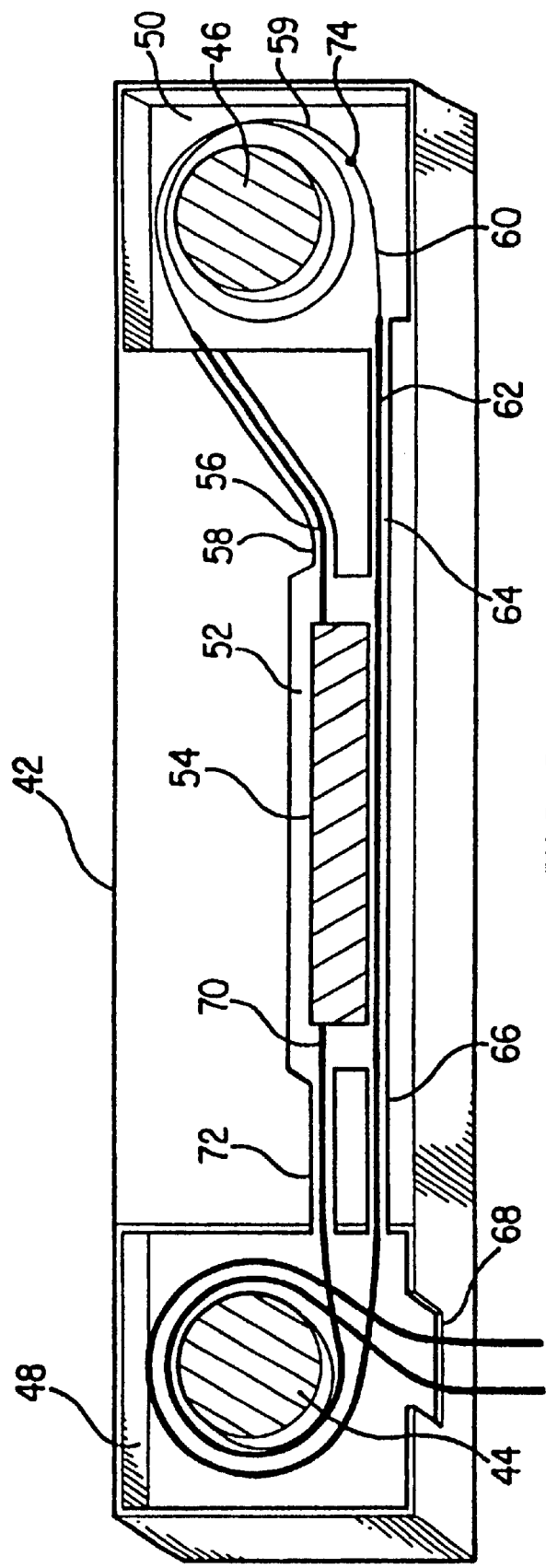
FIG. 2 is a perspective view of a known fiber storage device.
Figure 3:
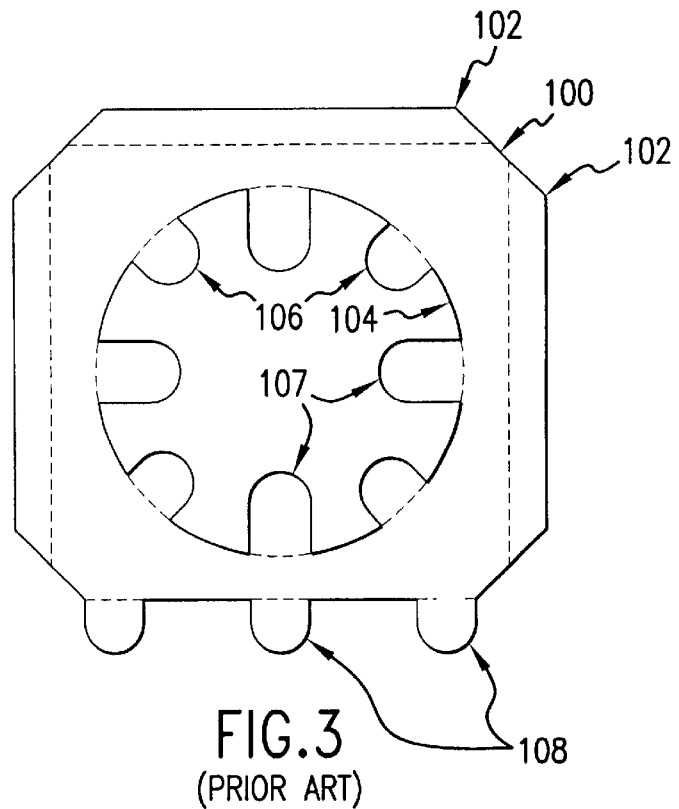
FIG. 3 is a top view of a known envelope bottom.
Figure 4:
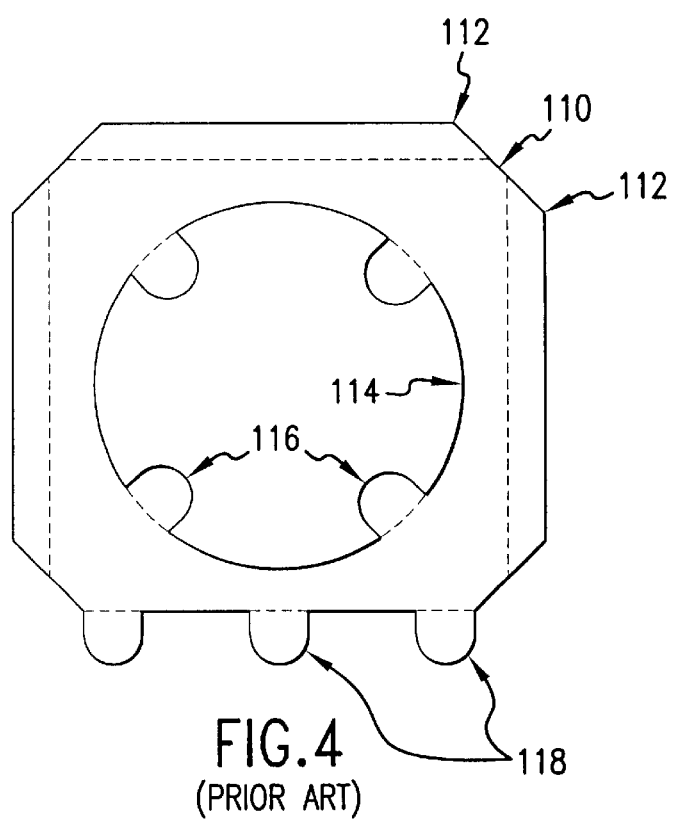
FIG. 4 is a top view of a known envelope liner.
Figure 5:
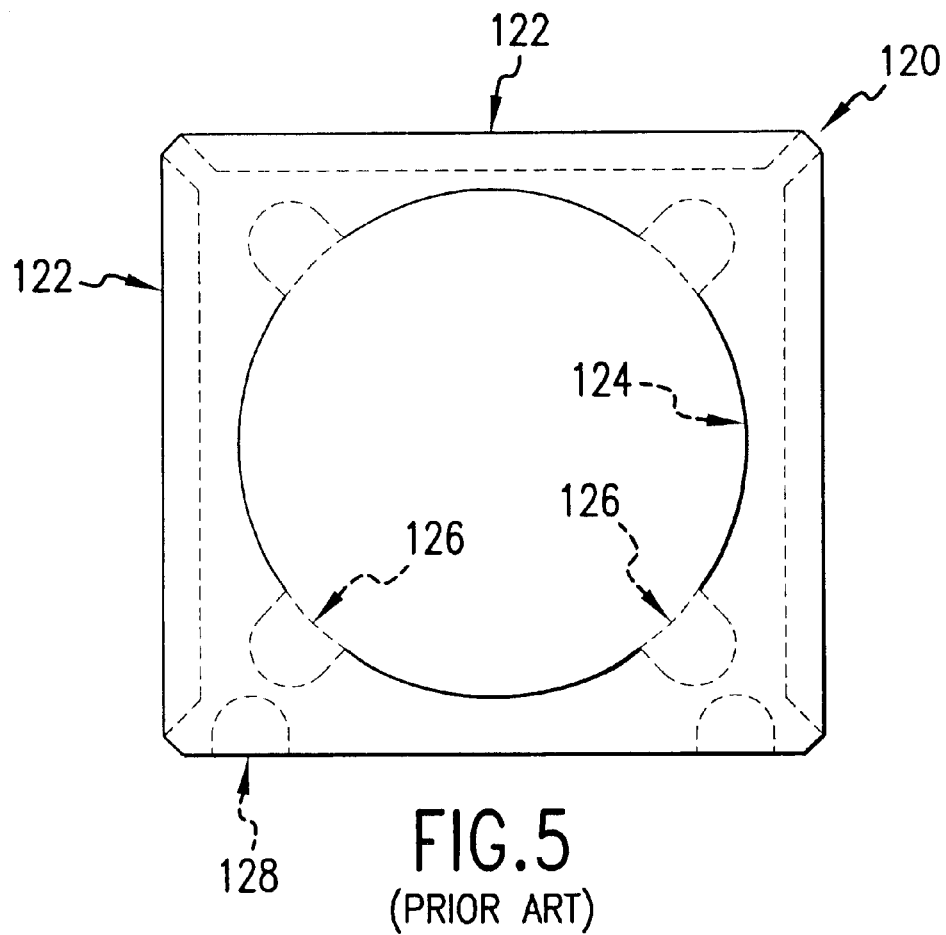
FIG. 5 is a top view of a known envelope top.
Figure 6:
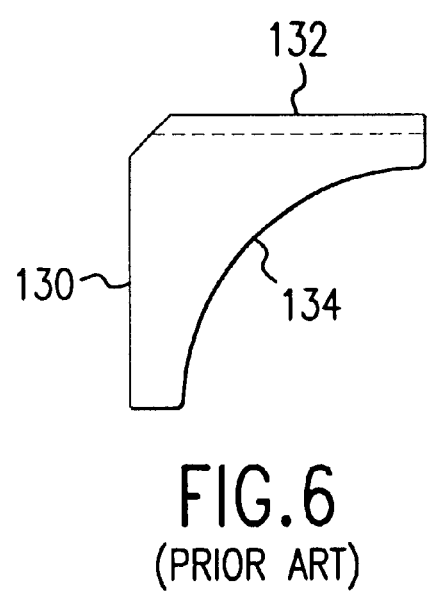
FIG. 6 is a top view of a known envelope corner protector.
Figure 7:
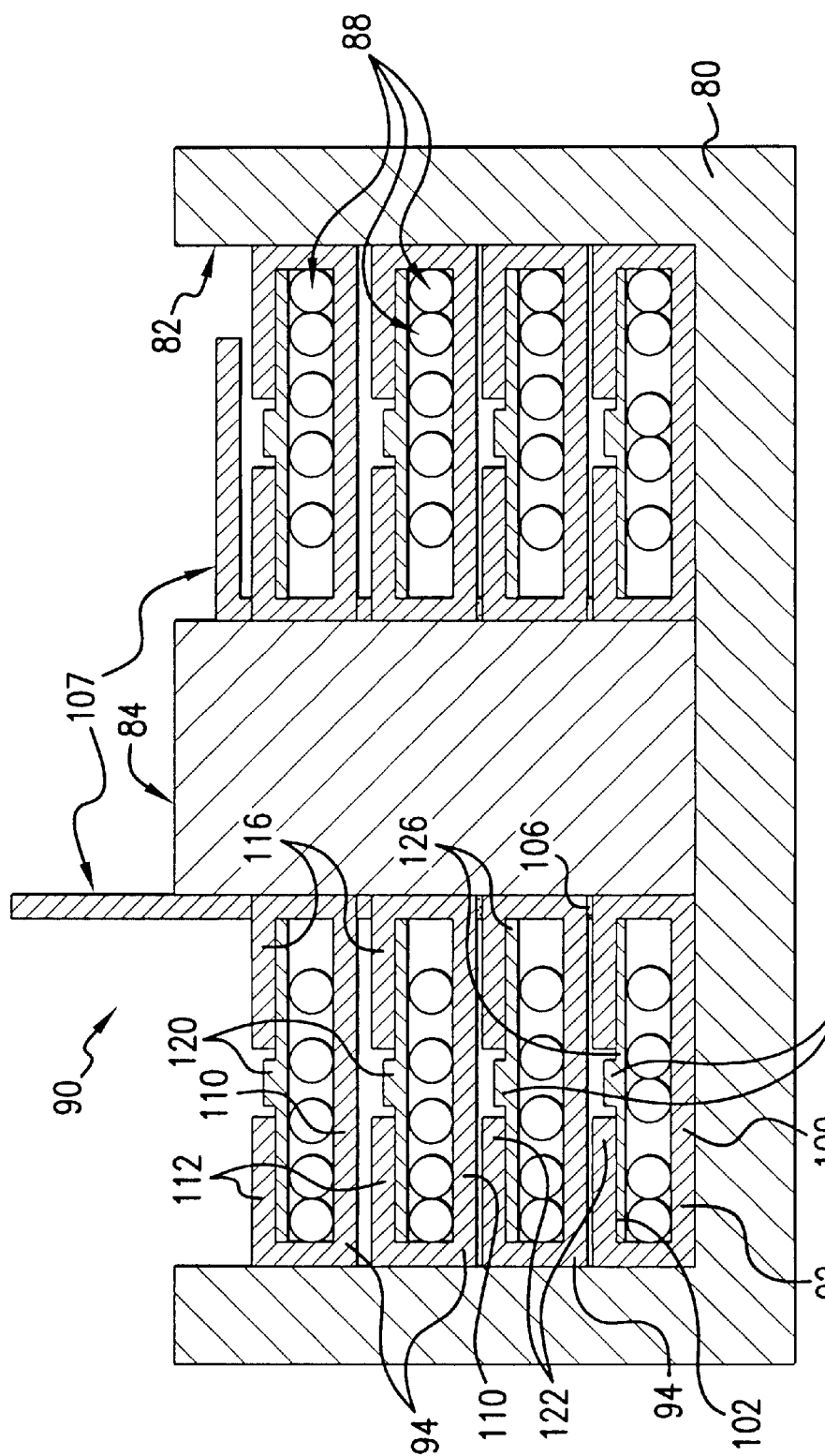
FIG. 7 is a cross-sectional view of a known multi-envelope assembly.

Embodiments of the present invention can provide a device for storing at least one fiber. Each of the embodiments of the present invention can include embodiments of at least two of the following components: a separator, a plurality of lifters, and a secluder.

For each of these components, the following information is provided: definitions of terms, a detailed description of one or more embodiments, advantages of the described embodiments, and descriptions of alternative embodiments. This information is followed by a detailed description of one combination of these components, and by a discussion of advantages that can be provided by various combinations of these components.

The Separator

Embodiments of the separator are described in "Device for Separating Portions of Spooled Optical Fibers", Ser. No. 09/317,827, filed May 25, 1999, which is incorporated by reference.

Embodiments of the separator can separate a first fiber portion from a second fiber portion of a fiber. The separator can define at least one inner bearing surface adapted to restrain the first fiber portion from straightening when coiled within the separator. The separator can also define at least one outer bearing surface that can be adapted to limit a path defined by the second fiber portion when coiled on the separator. The path can vary with a longitudinal tension in the second fiber portion. The path can have a plurality of curves each having a radius. The radius of each curve of the path can at least meet a reliability-adjusted minimum bending radius of the second fiber portion. The separator can also define at least one separator opening adapted for passing the fiber therethrough.

Definitions pertinent to the Separator

As used with the term "separator" herein, the term "fiber" can include any type of fiber in any system or component, provided that the fiber has at least a first fiber portion connected to a second fiber portion. For example, the fiber can be an optical fiber that has a jacketed portion connected to a bare portion.

As used herein, the term "separator" can include any device or combination of devices that serve to separate a first fiber portion from a second fiber portion.

As used herein, the term "bearing surface" can include one or more points, lines, or areas, or combination thereof, upon which a fiber, or one or more portions of a fiber, can bear.

As used herein, the term "separator opening" can include any aperture in the separator through which the fiber can pass approximately where it transitions from the first fiber portion to the second fiber portion.

As used herein, the term "path" can include the route of a fiber, the location of a portion of a fiber, or the location of an entire fiber.

As used herein, the term "longitudinal tension" refers to tensile forces applied to a fiber, in a direction parallel to the length of the fiber.

As used herein, the term "reliability-adjusted minimum bending radius" refers to that radius value, below which, the portion of the fiber bent thereto has a significantly increased likelihood of experiencing substantial degradation of structural or optical properties during the predetermined design life of the fiber.

Detailed Description of the Separator

Figure 8:
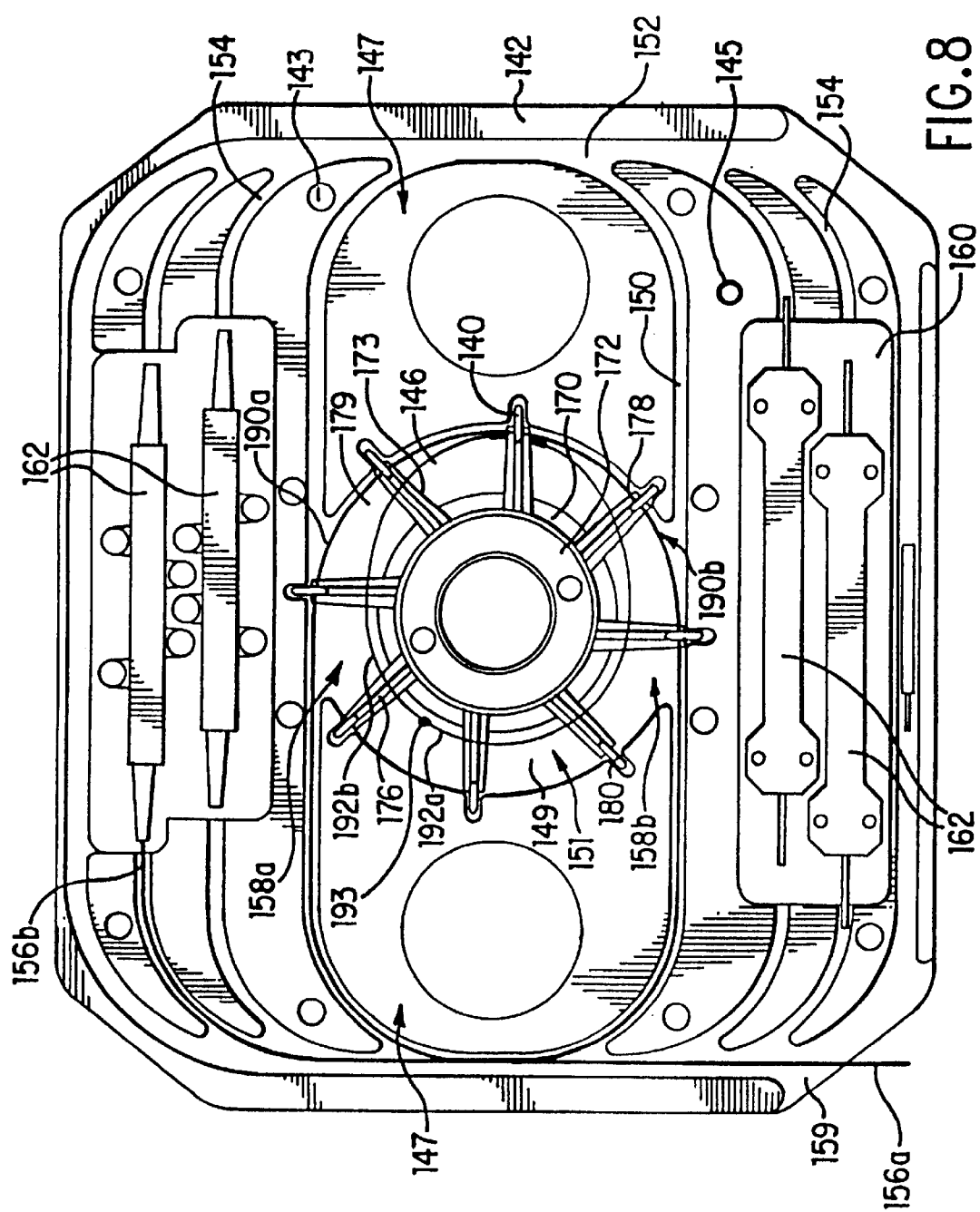
FIG. 8 is a top view of an embodiment of a separator assembly in conjunction with a tray assembly.

Embodiments of the fiber storage assembly of the present invention can include a separator. Referring to FIG. 8, separator assembly 140 can work in conjunction with a fiber storage tray 142, which can define an elongated generally circular fiber storage well 146. Tray 142 also can define several types of channels, including well channels 150, portal channels 152, and device channels 154. Well channels 150 can provide for routing fibers 156*a* and 156*b* through well openings 158*a* and 158*b*, respectively, and into fiber storage well 146. Portal channels 152 can terminate at portals 159, which breach the outer edge of tray 142. Portal channels 152 can also connect to well channels 150. Device channels 154 can connect portal channels 152 to device cavities 160.

Device cavities 160 can provide a space for mounting optical devices 162 such that the top of each optical device 162 can be at or below the height of top surface 147 of tray 142. This can allow a flat tray cover (not shown) having an alignment pin (not shown) to be aligned with alignment hole 145 and attached over tray 142 by screws (not shown) connected to tray 142 at cover holes 143.

Tray 142 can contain two device cavities 160 that can each hold two optical devices 162. Although not shown, each optical device can have an optical fiber extending from each longitudinal end. As shown, one of the optical devices 162 can have optical fiber 156*b* extending from one of its longitudinal ends. The routing of fiber 156*b* will be described below. In an alternative embodiment, tray 142 can be designed to not have optical devices 162 mounted therein. In such an embodiment, tray 142 can also be designed to not include device cavities 160 or device channels 154.

Elongated generally annular spool 170 can be formed as an integral part of tray 142 within the circumference of fiber storage well 146. Alternatively, elongated generally annular spool 170 can be formed separate from and connected to tray 142. Spool 170 and tray 142 can be constructed of, for example, aluminum. Alternatively, spool 170 and tray 142 can be constructed of any material, including, but not limited to, metals, metallic alloys, plastics, rubbers, ceramics, woods, or composite materials. The outer radius of spool 170 can meet or exceed the reliability-adjusted minimum bending radius of bare fibers 192*a* and 192*b*.

The inner circumference of fiber storage well 146 can generally concentrically substantially surround spool 170. The placement of spool 170 within well 146 can define an elongated annular fiber storage space 149 and an annular fiber-supporting surface 151. Spool 170 can generally concentrically substantially surround elongated generally annular hub 172. A plurality of elongated generally cylindrical connector arms 176 can be connected to hub 172, and can extend generally radially from hub 172 through one-to-one corresponding gaps 173 in spool 170.

Figure 9:
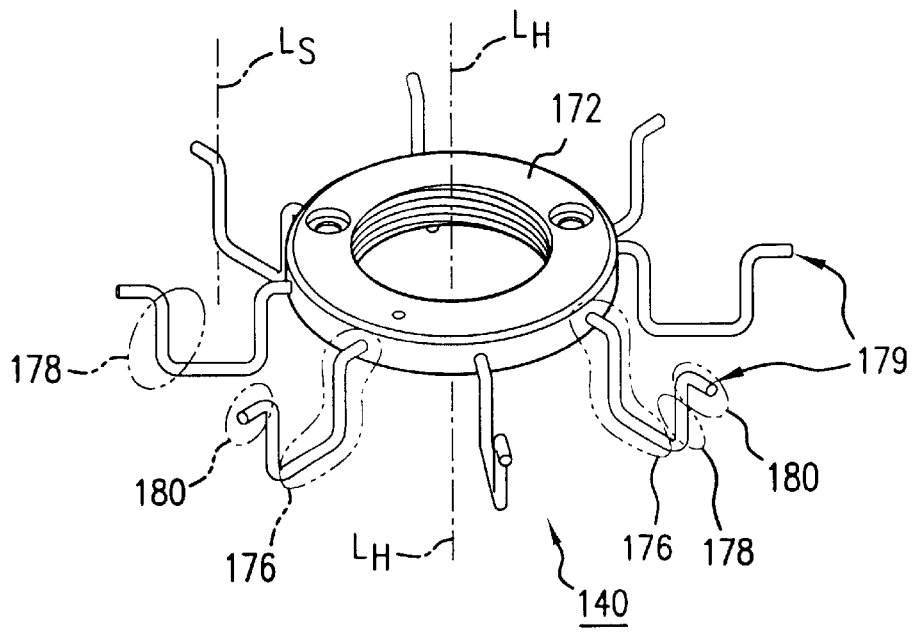
FIG. 9 is a perspective view of an embodiment of a separator assembly.

FIG. 9 provides a perspective view of separator assembly 140. Attached to each of connector arms 176 can be an elongated generally cylindrical separator arm 178. The longitudinal axis ($L_S$) of each of separator arms 178 can be parallel to the longitudinal axis ($L_H$) of hub 172. Also, the plurality of separator arms 178 can be generally equally circumferentially distributed about $L_H$, thereby forming a generally annular pattern. Each separator arm 178 can be isolated from the other nearest separator arms by adjacent generally arcuate separator openings 179, each of which can be sufficiently wide to allow a jacketed fiber to pass therethrough.

Each of separator arms 178 can connect to an elongated generally cylindrical retaining arm 180. Thus, each connector arm 176 can be connected to a single corresponding separator arm 178, which can be connected to a single corresponding retaining arm 180.

The collection of separator arms 178 can define a separator, which can serve as an elongated annular device for coiling jacketed fibers thereon, for separating jacketed fibers from bare fibers, and for preventing spooled bare fibers from straightening when coiled within the separator. The collection of connector arms 176, separator arms 178, and retaining arms 180 can define a separator cage, which can generally resemble the radially extending spokes of a tire wheel when viewed from a point along $L_H$. The combination of hub 172 and the separator cage can form separator assembly 140, which can be constructed of stainless steel. Alternatively, separator assembly 140 or any of its components or sub-components can be constructed of any material, including, but not limited to, metals, metallic alloys, plastics, rubbers, ceramics, woods, or composite materials. Each arm of the separator cage can be created by forming a rod into a shape resembling the letter "U" having elongated serifs. This can be followed by attaching each of these bent rods to hub 172 using an epoxy.

Figure 10:
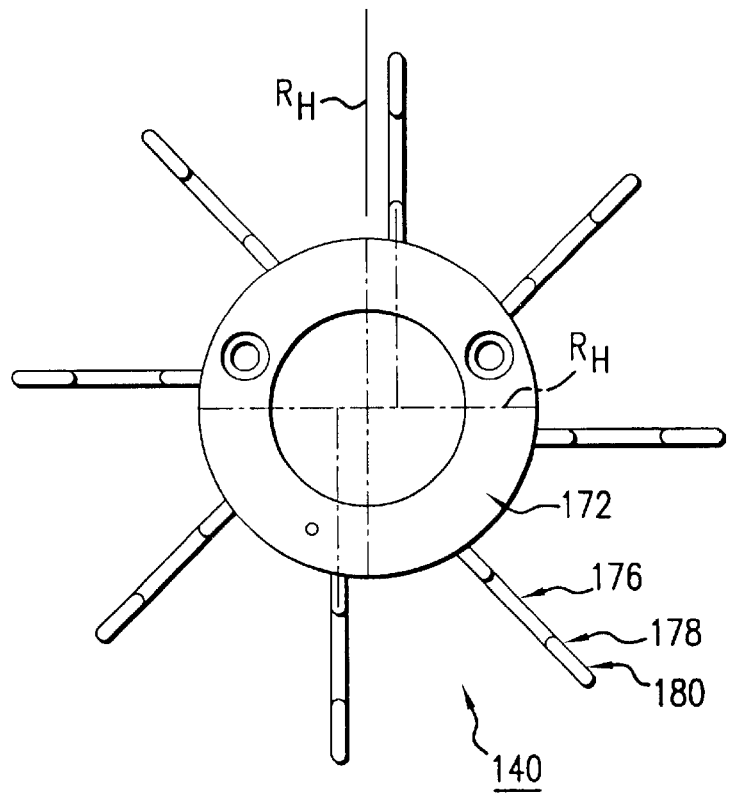
FIG. 10 is a top view of the separator assembly shown in FIG. 9.

FIG. 10 provides a top view of separator assembly 140, from a point along $L_H$. Connector arms 176 can take a straight path from hub 172 to separator arms 178. However, the longitudinal axes of connector arms 176 can be parallel to, but not coincident with the radii ("$R_H$") of hub 172, being offset therefrom throughout the length of connector arms 176. Alternatively, the longitudinal axes of connector arms 176 can be coincident with $R_H$. In yet another alternative, the inner ends of connector arms 176 can fall along different radii than the outer ends of connector arms 176. In still another alternative, connector arms 176 can be curvilinear, rather than straight. Thus, connector arms 176 can take essentially any path to connect hub 172 to separator arms 178.

As shown, each of retaining arms 180 can take a straight path to connect their terminal end to their respective separator arm 178. The longitudinal axis of each retaining arm 180 can be parallel to the longitudinal axis of its corresponding connector arm 176. Because connector arms 176 can be parallel to, but not necessarily coincident with $R_H$, retaining arms 180 also need not be coincident with $R_H$, and can be offset therefrom throughout the length of retaining arms 176. However, like connector arms 176, in an alternative embodiment, retaining arms 180 can take any path to connect their terminal end to their respective separator arm 178.

Hub 172, and thus separator assembly 140, can be slidably moved along $L_H$. Typically, separator assembly 140 can be utilized in one of two positions along $L_H$. When away from tray 142, separator assembly 140 can be in the spooling/unspooling position shown in the cross-sectional view of FIG. 11 Otherwise, separator assembly 40 can be utilized in the storage position shown in the cross-sectional view of FIG. 12.

Figure 11:
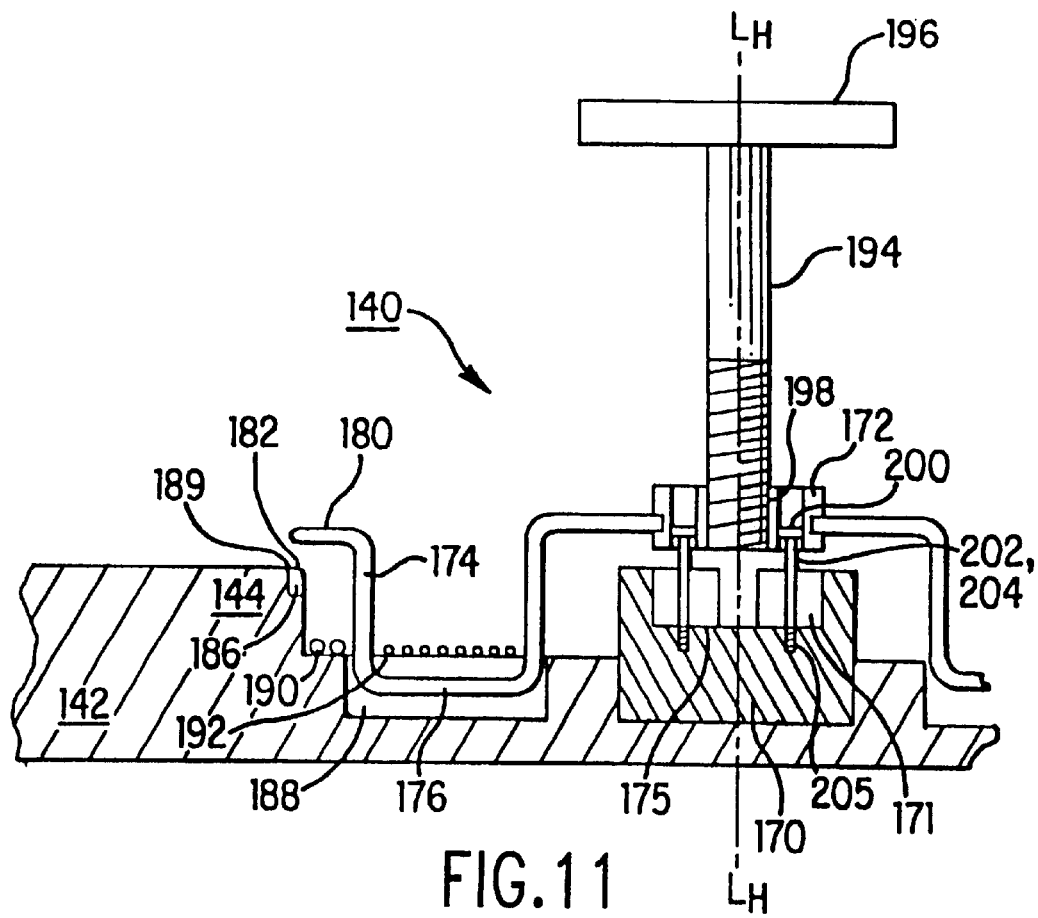
FIG. 11 is a cross-sectional view of the embodiment shown in FIG. 8 in the spooling/unspooling position.

Referring to FIG. 11, retaining arms 180 can overlap well edge 182 of tray 142 by an amount sufficient to prevent jacketed fiber 190 from uncoiling from about the separator. To accommodate retaining arms 180, well edge 182 can have a plurality of edge recesses 186 that can correspond in a one-to-one manner to, and can partially surround, retaining arms 180 to provide at least a slip fit. Tray 142 can include a plurality of connector arm recesses 188 that can correspond in a one-to-one manner to connector arms 176 and can prevent connector arms 176 from contacting bare fiber 192. Connector arm recesses 188 can extend through spool 170.

Hub 172 can be moved away from tray 142 along $L_H$, thereby moving retaining arms 180 away from well edge 182. This can allow a jacketed fiber portion 190 to be wrapped around or unwrapped from around the separator. To move hub 172, elongated generally annular pipe 194, which can have straight threads on at least one end its outer surface, and which can have optional grip handle 196, can be threaded into the correspondingly threaded inner circumference 198 of the upper portion of hub 172. Then, depending on its initial position, hub 172 can be pushed toward tray 142 or pulled away from tray 142.

However, hub 172 can be restrained from moving along $L_H$ away from tray 142 more than the distance needed to place separator assembly 140 in the spooling/unspooling position. This restraint can be provided mechanically by the bearing of hub 172 against the underside of the heads 200 of a plurality of restraining screws 202. The shafts 204 of these screws 202 can extend in an unthreaded manner through hub 172 and can thread into holes 205 in spool 170, thereby controlling the maximum distance that hub 172 can be moved away from spool 170, and thus tray 142. This maximum distance can be adjusted by adjusting the height of the heads 200 of screws 202 from spool 170.

Also shown in FIG. 11 is generally annular hub recess 171, which can be defined by spool 170, and within which hub 172 can releasably rest on generally circular hub seat 175 when in the storage position. Although not shown, an alignment pin can be attached to hub 172 parallel to the longitudinal axis of hub 172, and can align with a corresponding alignment hole in hub seat 175.

Figure 12:
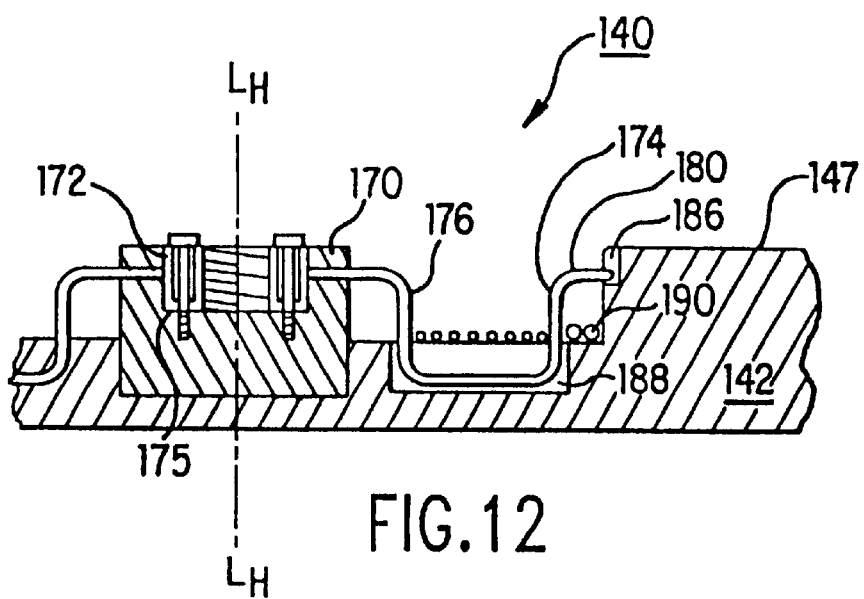
FIG. 12 is a cross-sectional view of the embodiment shown in FIG. 8 in the storage position.

Referring to FIG. 12, separator assembly 140 is shown in the storage position. In this position, because of the fitting of retaining arms 180 into retaining arm recesses 186, jacketed fiber 190 cannot be wrapped around or unwrapped from around the separator. Also, in this position, hub 172 can rest upon hub seat 175, and thus spool 170 and tray 142.

Top surface 147 of tray 142 can be higher than the top of separator assembly 140, and can thus allow a tray cover (not shown) to be attached to tray 142 without contacting separator assembly 140. Also, connector arm recesses 188 can be large enough to prevent connector arms 176 from contacting tray 142, and edge recesses 186 can be large enough to prevent retaining arms 180 from contacting tray 142.

Although not shown in FIG. 12, spool 170 can surround an elongated annular rod (not shown) having one end that can be supported by tray 142 and having an opposite end that extends slightly above hub seat 175 but below the top of spool 170. A circular disk (not shown), having a threaded outer circumference approximately matching the inner circumference 198 (not shown in FIG. 12) of hub 172, can be threaded into the inner diameter of hub 172 until the disk contacts the rod. Additional threading of the disk against the rod can cause hub 172 to rise off hub seat 175. Thus, the amount the disk is threaded into hub 175 can limit how close hub 172 can come to tray 142. This in turn can limit how close separator assembly 140, and particularly retaining arms 180 can come to tray 142. Therefore, the disk can be threaded downward to raise separator assembly 140 into the spooling/unspooling position of FIG. 11, or can be threaded upward to lower separator assembly 140 into the storage position of FIG. 12.

The operation of separator assembly 140 can be understood by reference to FIG. 8. It is assumed that separator assembly 140 is in the spooling position of FIG. 11. It is also assumed that a first fiber 156*a*, having a first jacketed portion 190*a* connected to a first bare portion 192*a*, has previously been spliced at splice 193 to a second bare portion 192*b*, which is connected to a second jacketed portion 190*b* of second fiber 156*b*. At first well opening 158*a*, first jacketed portion 190*a* can be routed into fiber storage well 146. Assuming first fiber 156*a* and second fiber 156*b* will be wrapped clockwise, first jacketed portion 190*a* can be then slipped beneath that retaining arm 180 that is nearest to first well opening 158*a* when proceeding clockwise from first well opening 158*a*. First jacketed portion 190*a* can be then urged downwards between the separator arm 178 corresponding to that retaining arm and the wall of fiber storage well 146. Advancing clockwise, first jacketed portion 190*a* can continue to be slipped beneath each successive retaining arm 180, and can thereby become spooled behind the corresponding separator arm 178.

When first jacketed portion 190*a* cannot reach another separator arm 178, first jacketed portion 190*a* can be routed through the adjacent separator opening 179, such that no more than about 1 inch of jacketed portion 190 is located inside the circumference defined by separator arms 178. First bare portion 192*a* and second bare portion 192*b* can be then spooled clockwise around spool 170, leaving only about 1 inch of second bare portion 192*b* unspooled. Then, second jacketed portion 190*b* can be routed through the adjacent separator opening 179, such that less than about 1 inch of second jacketed portion 190*b* is located inside the circumference defined by separator arms 178. Similar to first jacketed portion 190*a*, second jacketed portion 190*b* can be spooled clockwise behind separator arms 178 and then can be routed out of fiber storage well 146 at second well opening 158*b*. At this point, either another fiber 156 can be spooled above the previously spooled fiber(s), or separator assembly 140 can be moved into the storage position of FIG. 12.

Advantages of the Described Embodiment of the Separator

Thus, the described embodiment of the separator offers numerous advantages over the known fiber storage devices. For instance, the separator can allow a jacketed portion of at least one optical fiber to be spooled substantially separately from a bare portion of the fiber. The separator can be dimensioned to separate nearly any length of jacketed portion from nearly any length of bare portion. Moreover, even if the length of either portion changes, the separator can continue to separate the jacketed portion from the bare portion. Thus, the separator can prevent the jacketed portion from substantially intruding into the storage area of the bare portion, and can prevent the problems caused by changes in length of either portion.

The separator can also allow jacketed portions and bare portions to be stored in a very space-efficient manner. Moreover, the separator can allow the portions to be stored in a safer manner. For instance, the separator can allow both portions to be stored without violations of either portion's reliability-adjusted minimum bending radius. The separator can also allow the bare portions to avoid being stored within a fiber channel, where the bare fiber could be scratched by contact with a sharp corner.

By removing the requirement that jacketed portions be stored within fiber channels, the separator provides numerous additional design possibilities to the designer of the fiber storage assembly. For instance, the separator allows new shapes, dimensions, and patterns for the tray, restrainer, and fiber channels.

The separator can be adapted to be moved between a first position that allows the jacketed portion to be spooled, and a second position that prevents the jacketed portion from being unspooled. Also, the separator can be adapted to limit its movement to the first position and/or the second position.

Alternative Embodiments of the Separator

There can be a number of alternative embodiments for the invention. For example, the separator can be formed as an elongated annulus. In this embodiment, the separator can be a unitary body. Alternatively, the separator can be formed of a plurality of bodies, a further example of which will be discussed below.

When formed as an elongated annulus, both the inner perimeter and the outer perimeter of the separator can be circular. Alternatively, the separator can be formed in any curvilinear or rectilinear shape, or in any combination thereof. Furthermore, either perimeter can be any curvilinear or rectilinear shape, or in any combination thereof. Thus, either the inner bearing surface or the outer bearing surface of the separator can be one or more points, lines, or areas, or any combination thereof.

When the separator is embodied as an elongated annulus, both the inner perimeter and the outer perimeter of the separator can be continuous, both circumferentially and longitudinally along the separator. Moreover, in this embodiment, the separator's inner and outer perimeter can be uniform in their separation from each other at all points along each perimeter, and at all points along the length of the separator.

However, in one alternative embodiment, the inner and/or outer diameter of the annulus can vary along its length. In another alternative embodiment, the annulus can have one or more openings in its annular wall, and any of these openings can extend for any portion of the length of the separator. Thus, the separation between the separator's inner and outer perimeters can vary between positive values and zero.

In another alternative embodiment, the separator can be a plurality of bodies. For example, the separator can be a plurality of parallel rods arranged to form the vertices of a regular polygon. In this embodiment, the rods can collectively define an inner perimeter and an outer perimeter, each in the shape of regular polygons, yet the separator itself is not a single body. The rods can be any shape, including straight, segmented, and curved. The rods can be arranged parallel to each other or not parallel. The rods can be arranged such that either the inner perimeter and/or the outer perimeter defined thereby can form a regular polygon, or an irregular polygon, or any rectilinear shape, or any curvilinear shape, or any shape that is both rectilinear and curvilinear. Moreover, either perimeter can be continuous or discontinuous. Thus, either the inner bearing surface or the outer bearing surface of the separator can be one or more points, lines, or areas, or any combination thereof. Again, the separation between the inner perimeter and the outer perimeter, either along those perimeters, or along the length of the separator, can vary between positive values and zero.

As an additional alternative embodiment, the separator can be portable. This can be advantageous when there is a need to insert an optical component into an existing optical circuit, such as can be the case when the circuit design must be modified after initial design or assembly. The new optical component can be mounted somewhere near the insertion location, and the component's separator can be movably mounted nearby, thereby providing convenient and space-efficient separation for the bare and jacketed portions of the component's fibers.

To facilitate its operation, the separator can be supported by, or movably mounted to, a base. The base can include any device or combination of devices that define a surface. For example, the base can be a generally planar surface. Alternatively, the base can be a surface having concave portions, or convex portions, or stepped portions, or various irregularities. Alternatively, the separator can be an integral part of the base.

In some alternative embodiments, the separator can prevent the fiber portion coiled within the separator from coiling so tightly that the reliability-adjusted minimum bending radius of the fiber is violated. Alternatively, the separator can be used in combination with a spool, or can include an integral spool to accomplish this task. As used herein, the term "spool" can include any device or combination of devices defining at least one outer bearing surface about which a portion of the fiber coiled within the separator can be spooled such that any curvature formed in the fiber can at least meet the fiber's reliability-adjusted minimum bending radius. Thus, there can be a number of alternative embodiments for the spool. For example, like the separator, the outer perimeter defined by the spool can be continuous, or can have interruptions. In addition, the outer perimeter defined by the spool can be circular or polygonal. Moreover, the spool can be a single device, such as an annulus, or can be a plurality of devices, such as arms or fingers. Furthermore, the spool can be adapted to extend perpendicular to the tray or to extend merely generally away from the tray. Thus, the outer bearing surface of the spool can be one or more points, lines, or areas, or any combination thereof.

In some alternative embodiments, the separator can prevent the fiber portion coiled about the separator from straightening. However, the separator can be used in combination with, or can include an integral restrainer to accomplish this task. As used herein, the term "restrainer" can include any device or combination of devices that prevent the fiber coiled about the separator from straightening. The restrainer can define an inner bearing surface, similar to that of the separator. The inner bearing surface of the restrainer can be one or more points, lines, or areas, or any combination thereof.

In one embodiment, the restrainer can be a well defined within the tray. Such a well can be any shape, including circular. Alternatively, the restrainer can be an annulus attached to a base. In another alternative embodiment, the restrainer can comprise one or more arms or posts generally extending away from the base. In all these cases, the restrainer can prevent a fiber coiled about the separator from straightening by uncoiling.

The separator or the restrainer can include an apparatus to prevent a fiber coiled about the separator from straightening by sliding off either end of the separator. For example, as in FIG. 11, the separator can be movably attached to a tray at one end and can include retaining arms attached to its other end. In an alternative embodiment, the retaining arms can be attached to the separator arms, but can also bend back towards the tray so that they become approximately parallel to the separator arms, and can engage with holes in the tray to prevent a coiled fiber from straightening. In yet another alternative embodiment, a cap can attach to one or both ends of the separator, the cap having a larger perimeter than the outer perimeter defined by the separator. In still another alternative embodiment, retaining arms or a cap can attach to the restrainer. In another alternative embodiment, the retaining arms can be replaced by a generally flat annular band attached to the separator.

In yet another alternative embodiment, the restrainer can be one or more pieces of tape, string, or adhesive that secure the fiber to itself, the separator, a tray, or a base.

Figure 13:
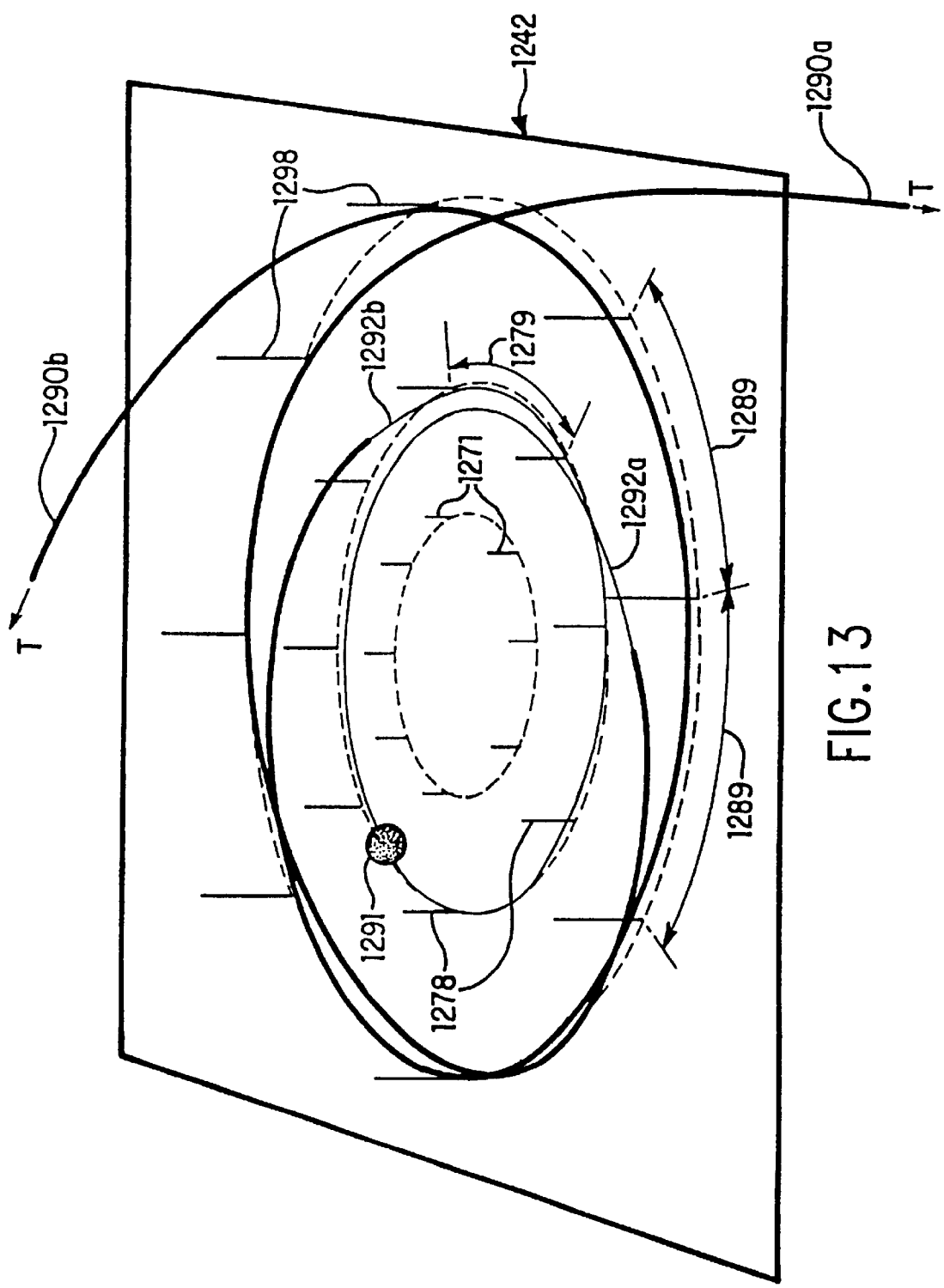
FIG. 13 is a perspective view of an alternative embodiment of a separator assembly.

FIG. 13 provides a perspective view of one embodiment that includes several of the aforementioned alternatives. A separator can be defined by a plurality of cylindrical separator arms 1278 that can be mounted on or extend through base 1242. Likewise, a spool can be defined by a plurality of cylindrical spool arms 1271 that can be mounted on or extend through base 1242. Likewise, a restrainer can be defined by a plurality of cylindrical restrainer arms 1298 that can be mounted on or extend through base 1242.

Jacketed fibers 1290a and 1290b can be subject to variable longitudinal tension T. Jacketed fiber 1290a can be attached to bare fiber 1292a. Jacketed fiber 1290b can be attached to bare fiber 1292b. Bare fiber 1292a can be attached to bare fiber 1292b at splice 1291. The combination of the attached fibers 1290a, 1290b, 1292a, and 1292b can define a fiber.

In operation, jacketed fibers 1290a and 1290b can be coiled within the restrainer and about the separator. Bare fibers 1292a and 1292b can be coiled within the separator and about the spool. Between separator arms 1278 can be openings 1279 that allow jacketed fibers 1290a and 1290b to enter and exit the separator. Between restrainer arms 1298 can be openings 1289 that allow jacketed fibers 1290a and 1290b to enter and exit the restrainer.

The separator can define at least one inner bearing surface that can restrain bare fibers 1292a and 1292b from uncoiling. The separator can also define at least one outer bearing surface that can limit the curvature of the path taken by jacketed fibers 1290a and 1290b such that the radius of every curve on that path can at least meet the reliability-adjusted minimum bending radius of jacketed fibers 1290a and 1290b. The location, extent, and number of these inner and outer bearing surfaces, as well as the jacketed fibers' path curvatures, can depend on the amount of longitudinal tension T in jacketed fibers 1290a and 1290b. The restrainer can define at least one inner restrainment bearing surface that can restrain jacketed fibers 1290a and 1290b from uncoiling. The location, extent, and number of these inner restrainment bearing surfaces can also depend on the amount of longitudinal tension T in jacketed fibers 1290a and 1290b.

The cylindrical arms of either the separator, or the spool, or the restrainer can include perpendicular retaining arms (not shown) that can prevent the respective portion of the fiber from uncoiling by sliding along the arms and away from base 1242. If they extend through base 1242, separator arms 1278 can be connected to a hubor plate, thereby allowing separator arms 1278 to be moved collectively in a direction parallel to their longitudinal axes, and thereby into either a spooling position or a storage position. Likewise, spool arms 1271 or restrainer arms 1298 can also be connected to one or more rims or plates, thereby allowing either or both sets of arms to be moved collectively in a direction parallel to their longitudinal axes.

Thus, a device can be provided for separating a first fiber portion from a second fiber portion. The device can include a separator that can define at least one inner bearing surface adapted to restrain the first fiber portion from straightening when coiled within the separator. The separator can also define at least one outer bearing surface that can be adapted to limit a path defined by the second fiber portion when coiled on the separator. The path can vary with a longitudinal tension in the second fiber portion. The path can have a plurality of curves each having a radius. The radius of each curve of the path can at least meet a reliability-adjusted minimum bending radius of the second fiber portion. The separator can also define at least one separator opening adapted for passing the fiber therethrough.

Still other advantages and embodiments of the separator will become readily apparent to those skilled in this art from the above-recited detailed description. Accordingly, the drawings and descriptions are to be regarded as illustrative in nature, and not as restrictive. For example, although not shown, the separator can be constructed using six, rather than eight, separator arms, with a corresponding number of connector arms and restraining arms.

The Plurality of Lifters

Embodiments of the plurality of lifters are described in "Device for Moving a Spooled Stack of Optical Fibers", Ser. No. 09/317,977, filed May 25, 1999, now U.S. Pat. No. 6,076,755, issued Jun. 20, 2000, which is incorporated by reference.

Embodiments of the plurality of lifters can move a plurality of fibers parallel to a spooling axis around which the fibers are spooled. The plurality of lifters can be adapted to be disposed beneath at least a bottom-most fiber from the plurality of fibers and adapted to be movable parallel to the spooling axis.

Definitions Pertinent to the Plurality of Lifters

As used with the term "plurality of lifters" herein, the term "fiber" can include any type of fiber in any system or component, provided that the fiber is spooled around a spooling axis. For example, the fiber can be an optical fiber such as that used in a submarine optical repeater or branching station.

As used herein, the term "lifter" can include any type of device that is adapted to be disposed beneath at least a bottom-most fiber from the plurality of fibers and is adapted to be movable parallel to the spooling axis.

Detailed Description of the Plurality of Lifters

Figure 14:
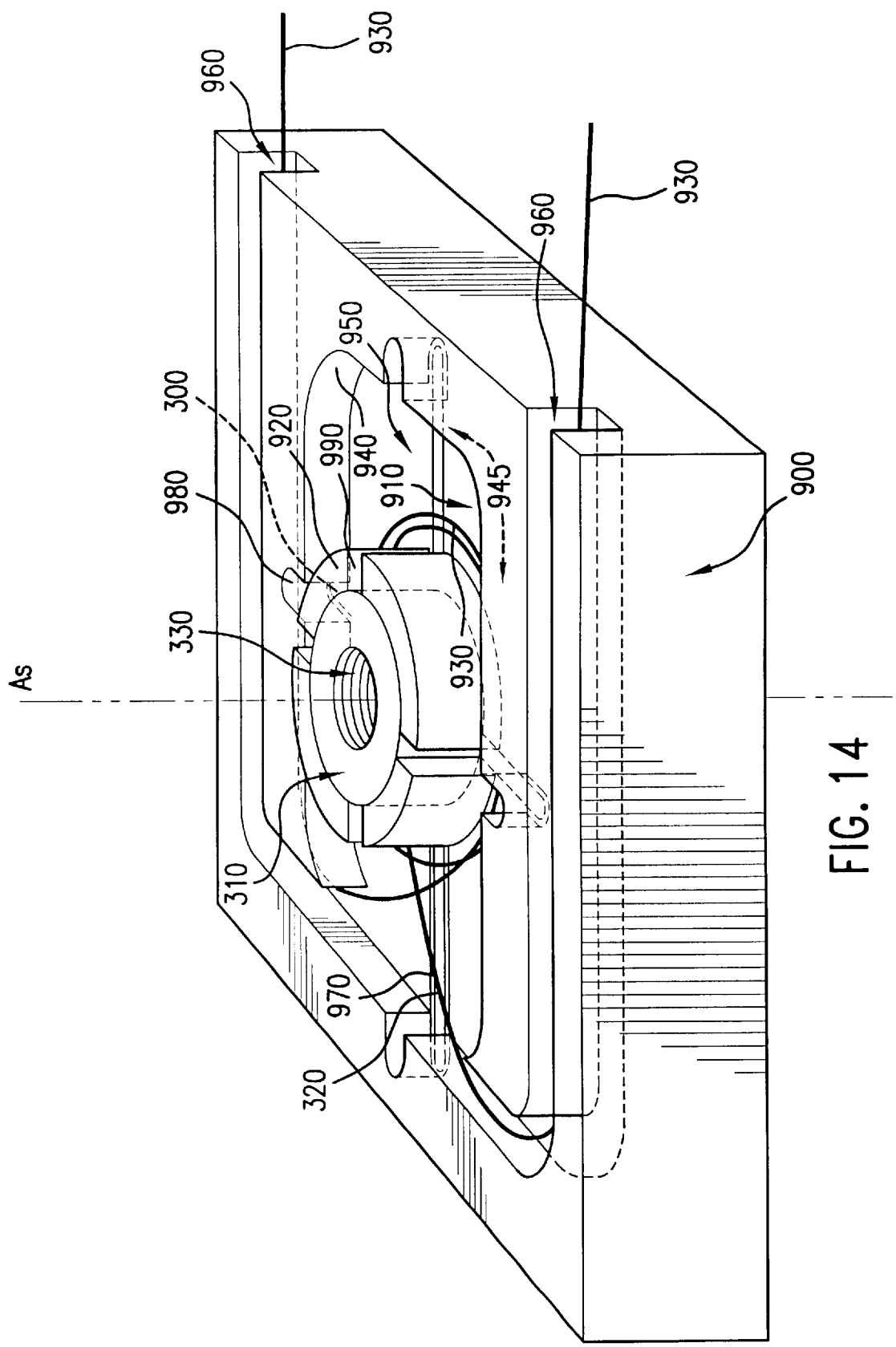
FIG. 14 is a perspective view of an embodiment of a lifting device in conjunction with a tray assembly.

The fiber storage assembly of the present invention can include a plurality of lifters. FIG. 14 provides a perspective view of lifting device 300 which can work in conjunction with a fiber storage tray 900 having a well 910 that extends partially through the thickness of tray 900, thereby forming base 950, and well walls 940, and storage space 945. Well 910 can restrain spooled fibers from straightening. Well 910 can be any shape, and can be defined by a plurality of restrainment arms. However, well 910 is shown as an elongated generally circular shape, and thus base 950 can be generally circular, and well walls 940 can combine to form a generally continuous circumferential wall. Attached to base 950 and contained within well walls 940 can be at least one elongated generally annular spool 920 around which each fiber 930 can be spooled. Because spool 920 can be an elongated annular shape, it can have a longitudinal axis which can serve as a spooling axis ("$A_S$"). Also defined within tray 900 can be portal channels 960 for routing fibers 930 into and out of tray 900. Tray 900 can have additional channels (not shown) to route fibers to any optical devices (not shown) mounted on tray 900.

Lifting device 300 can comprise elongated generally annular wheel 310 and a plurality of lifters 320. Wheel 310 can rest against tray 900, and can be moved along its longitudinal axis away from tray 900. Spool 920 can substantially surround wheel 310, thereby radially constraining the motion of wheel 310.

Lifters 320 can be elongated, and can have a generally rectangular longitudinal cross-section, and can be generally equally distributed circumferentially around wheel 310. Lifters 320 can extend radially from wheel 310, through gaps 990 in spool 920, and through arm recesses 970 in base 950. Extending longitudinally along well wall 940 can be tip recesses 980 wherein lifters 320 can longitudinally terminate. However, in other embodiments, the lifters can have other shapes and can be distributed in any manner, so long as the shape and distribution of the lifters allow the lifters to be disposed beneath at least one spooled fiber and to be movable parallel to the spooling axis.

In operation, wheel 310 can be moved vertically, along its longitudinal axis, to either a lower position, or to an upper position. In the lower position (shown), wheel 310 can allow spooled fibers 930 to be stored within well 910. When wheel 310 is in its lower position, wheel 310 can rest upon tray 900, and lifters 320 can be contained within arm recesses 970 so that no part of lifters 320 is above base 950. With lifters 320 contained below base 950, a first fiber 930 can be spooled on base 950, and additional fibers can be spooled above first fiber 930, one above the other.

To move a stack of fibers (not shown) out of well 910, wheel 310 can be moved along its longitudinal axis away from tray 900 toward the upper position (not shown). During this movement, lifters 320 can rise out of arm recesses 970 and can begin to press against the bottom-most spooled fiber 930, thereby lifting the entire stack of fibers to the upper position. In the upper position, fibers 930 can be completely removed from well 910. To assist in moving wheel 310, threaded rod (not shown), having an optional handle (not shown) can be screwed into the threaded inner circumference 330 of wheel 310 from above. Alternatively, threaded rod (not shown), having an optional handle (not shown) can extend through a hole (not shown) in the bottom of tray 900, and be screwed into the threaded inner circumference 330 of wheel 310 from below. Using the rod, wheel 310 can be moved away from tray 900 or moved toward tray 900.

Alternatively, the rod can be threaded through wheel 310 from above until it contacts tray 900, it which point continued threading of the rod can cause wheel 310 to lift within well 910. Because lifters 320 can extend into tip recesses 980, wheel 310 can be prevented from spinning when the rod is threaded within wheel 310.

Figure 15:
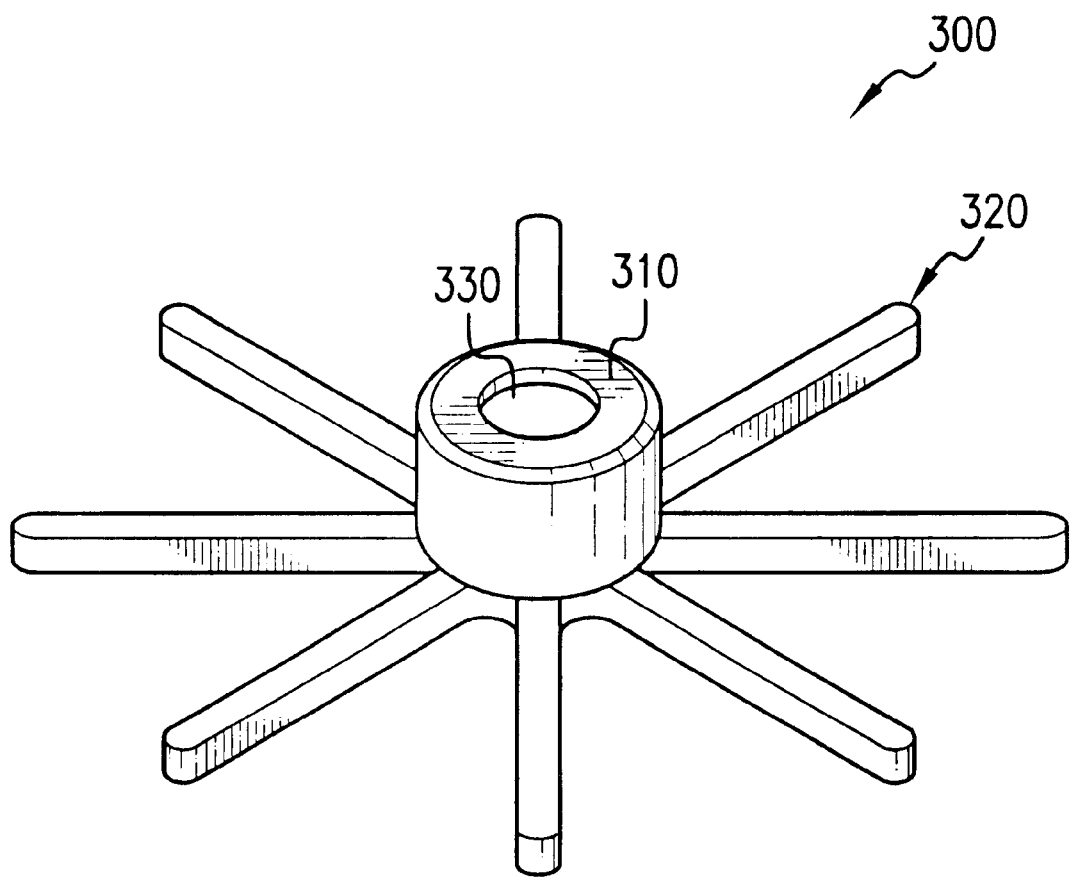
FIG. 15 is a perspective view of an alternative embodiment of a lifting device.

FIG. 15 provides a perspective view of an another embodiment of lifting device 300. Integral to wheel 310 can be eight approximately equally circumferentially spaced lifters 320. The inner circumference of lifting device 300, including the inner circumference of wheel 310, can be threaded.

Figure 16:
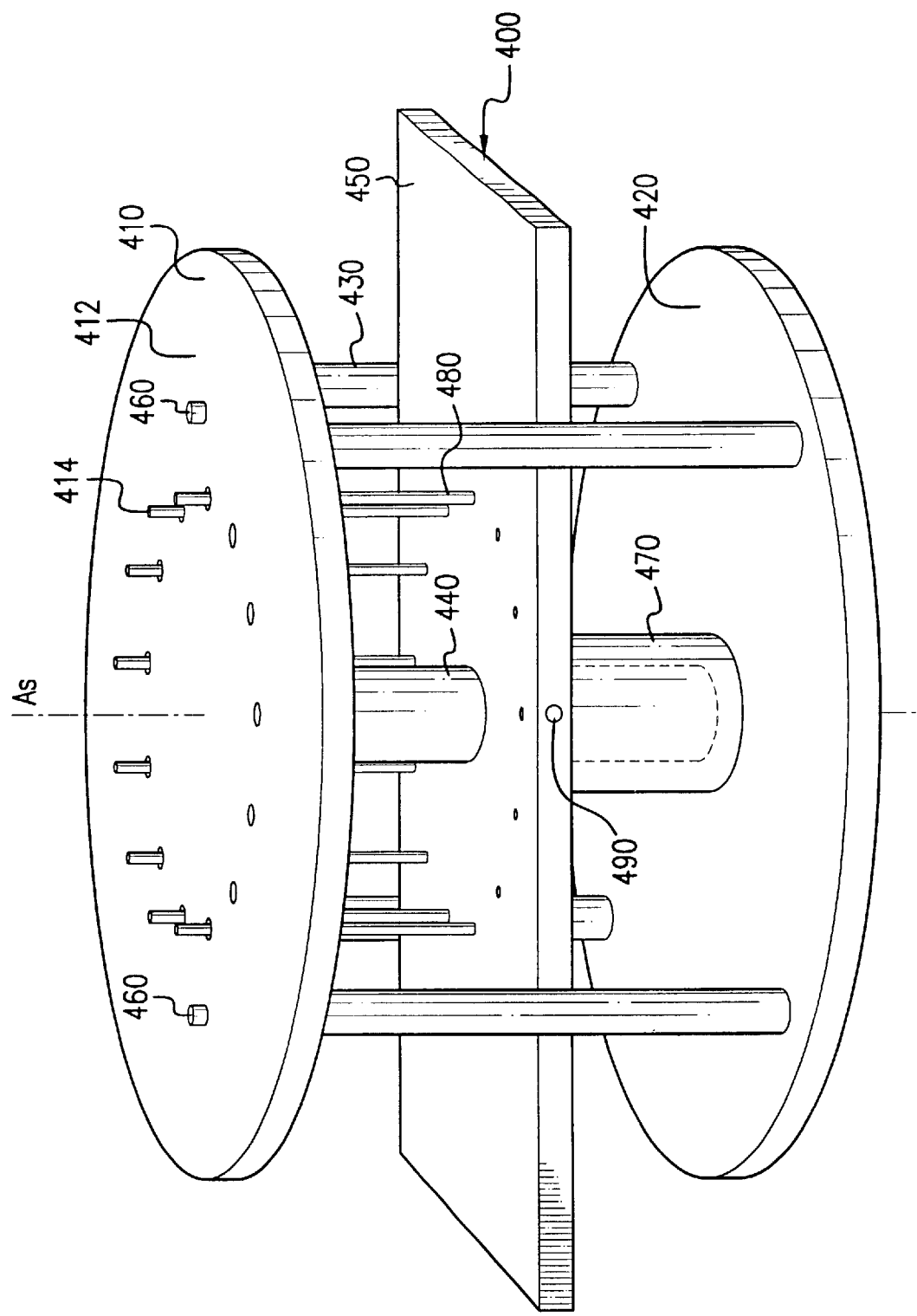
FIG. 16 is a perspective view of another alternative embodiment of a lifting device.

FIG. 16 provides a perspective view of an alternative embodiment of the present invention. Lifting device 400 can be removably in contact with base 800 (shown in FIG. 17). Generally flat circular top plate 410, which can be separated from a generally parallel, flat, circular, bottom plate 420 by perpendicular elongated center rod 440, can form a base supporting structure resembling a table. Four rod-like legs 430 can also be attached generally perpendicularly between top plate 410 and bottom plate 420 to stabilize top plate 410. Perpendicular to, and slidably surrounding center rod 440 can be a generally flat rectangular lifting plate 450. Attached to the top of lifting plate 450 in an annular pattern that can be co-axial with the longitudinal axis of center rod 440 (and spooling axis $A_S$) can be a plurality (partially shown) of lifters 480. Corresponding to lifters 480 can be a plurality of plate holes 414 in top plate 410. At least two short locating pins 460 can extend from the top surface 412 of top plate 410.

In operation, lifting plate 450 can be moved along center rod 440 from the lower position (shown in FIG. 16) to an upper position (not shown) and eventually, back to the lower position. In the lower position, elongated generally circular stop 470 can surround center rod 440 below lifting plate 450, thereby preventing lifting plate 450 from traveling along center rod 440 below the lower position. In the upper position, the contact of lifting plate 450 against top plate 410 can prevent lifting plate 450 from rising higher. A threaded elongated circular locking screw 490 can extend radially from center rod 440 and through lifting plate 450, thereby providing a locking means that can prevent the travel of lifting plate 450 along center rod 440. Alternatively, to prevent the travel of lifting plate 450 along center rod 440, locking screw 490 can be replaced by a locking pin (not shown) that can extend into a corresponding hole (not shown) in center rod 440.

Figure 17:
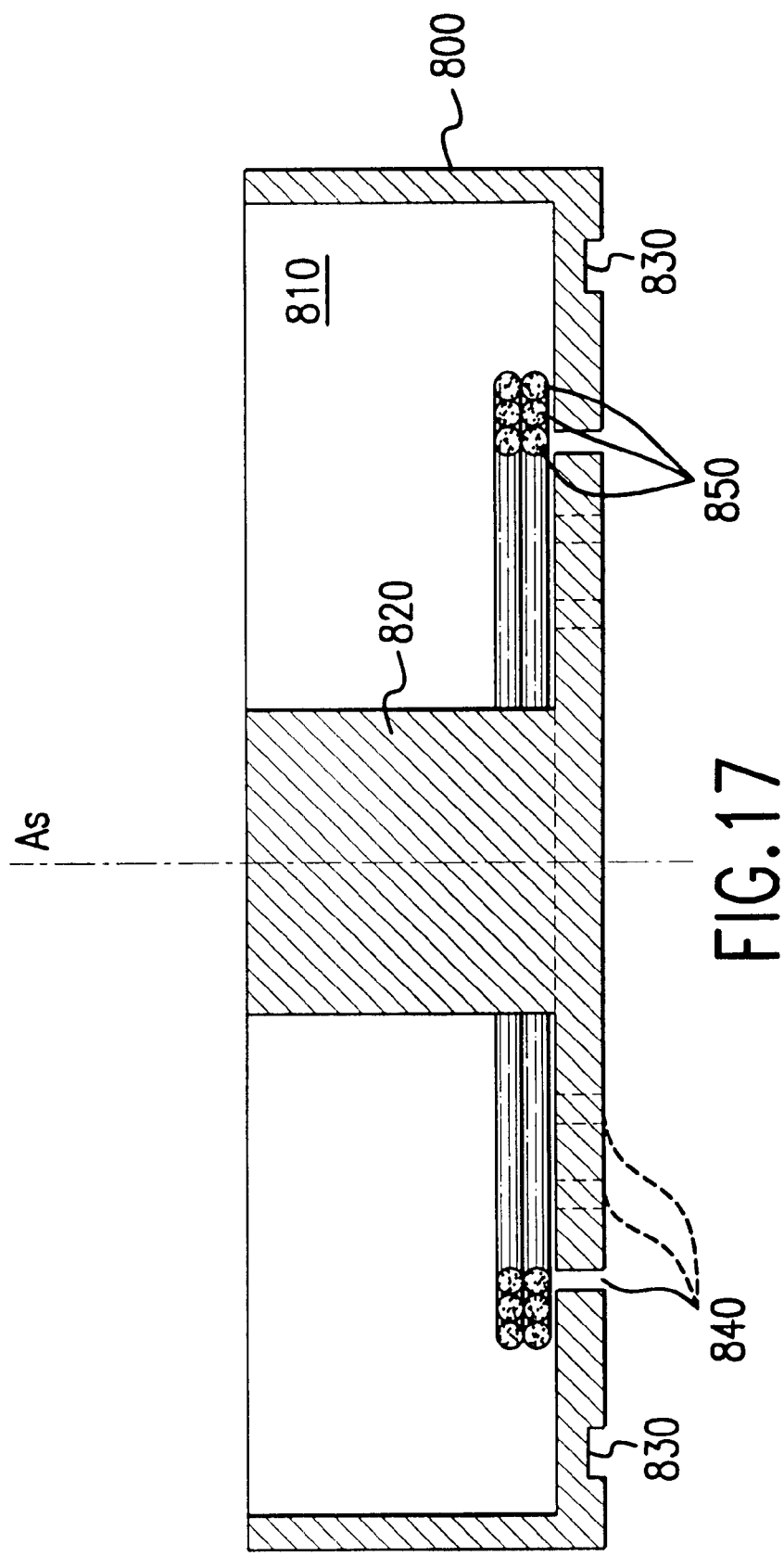
FIG. 17 is a cross-sectional view of a tray assembly that can be used with the lifting device shown in FIG. 16.

FIG. 17 provides a cross-sectional view of base 800. Extending partially through the thickness of base 800 can be elongated generally circular well 810. Connected to base 800, and concentric with well 810 can be elongated generally circular spool 820. Because spool 820 can be an elongated circular shape, it can have a longitudinal axis which serves as a spooling axis $A_S$. The bottom of base 800 can define two short locating recesses 830 that can correspond to locating pins 460, thereby allowing base 800 to be releasably mounted in a consistent location upon top plate 410. When base 800 rests upon top plate 410, center rod 440 can be co-axial with the longitudinal axis of well 810 and spool 820. Also defined in the bottom of base 800 can be a plurality of base holes 840 that can correspond in a one-to-one manner with lifters 480 and plate holes 414. Base holes 840 can be located directly beneath the expected storage location of spooled fibers 850.

Figure 18:
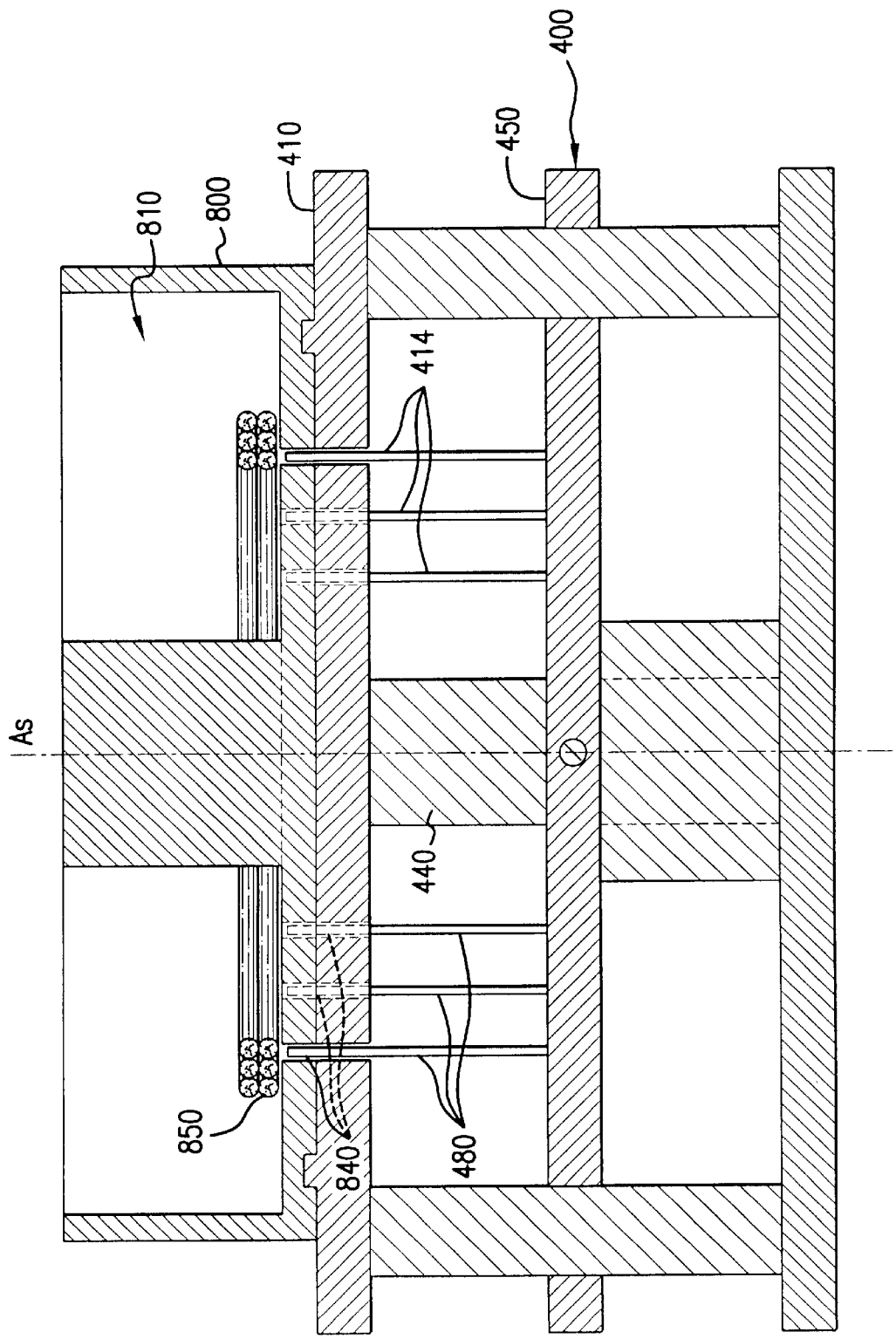
FIG. 18 is a cross-sectional view of the tray assembly shown in FIG. 17 being used with the lifting device shown in FIG. 16.

FIG. 18 provides a cross-sectional view of base 800 in operation with lifting device 400. When lifting plate 450 is in the lower position (shown), lifters 480 can extend through plate holes 414 and can terminate in base holes 840 without extending into well 810. When lifting plate 450 is moved to its upper position (not shown), lifters 480 can extend through base holes 840 and can contact the bottom-most spooled fiber 850 in well 810, lifting any fiber 850 spooled about spooling axis $A_S$ and any fibers stacked above fiber 850.

There are at least several notable differences between the two described embodiments of the present invention. Lifting device 300 of FIG. 14 can move the stack of spooled fibers by pulling or pushing wheel 310 from above. In contrast, lifting device 400 of FIG. 16 can move the stack of spooled fibers by pulling or pushing lifting plate 450 from below. Also, lifting device 300 can be contained within tray 900, thus increasing the weight of tray 900. In contrast, lifting device 400 can be separate from base 800, thus reducing the weight of base 800.

Advantages of the Described Embodiment of the Plurality of Lifters

Both described embodiments can provide a plurality of lifters. Regardless of the dimensions of the well, these lifters can move one or more stored fibers to the top, or near the top, of the well. Thus, these lifters can provide an assembler with easy access to a stored fiber. Moreover, these lifters can reduce the risk that a fiber will be damaged when accessed. Furthermore, the lifters can be locked into a desired position to prevent a fiber from moving vertically.

Alternative Embodiments of the Plurality of Lifters

Figure 19:
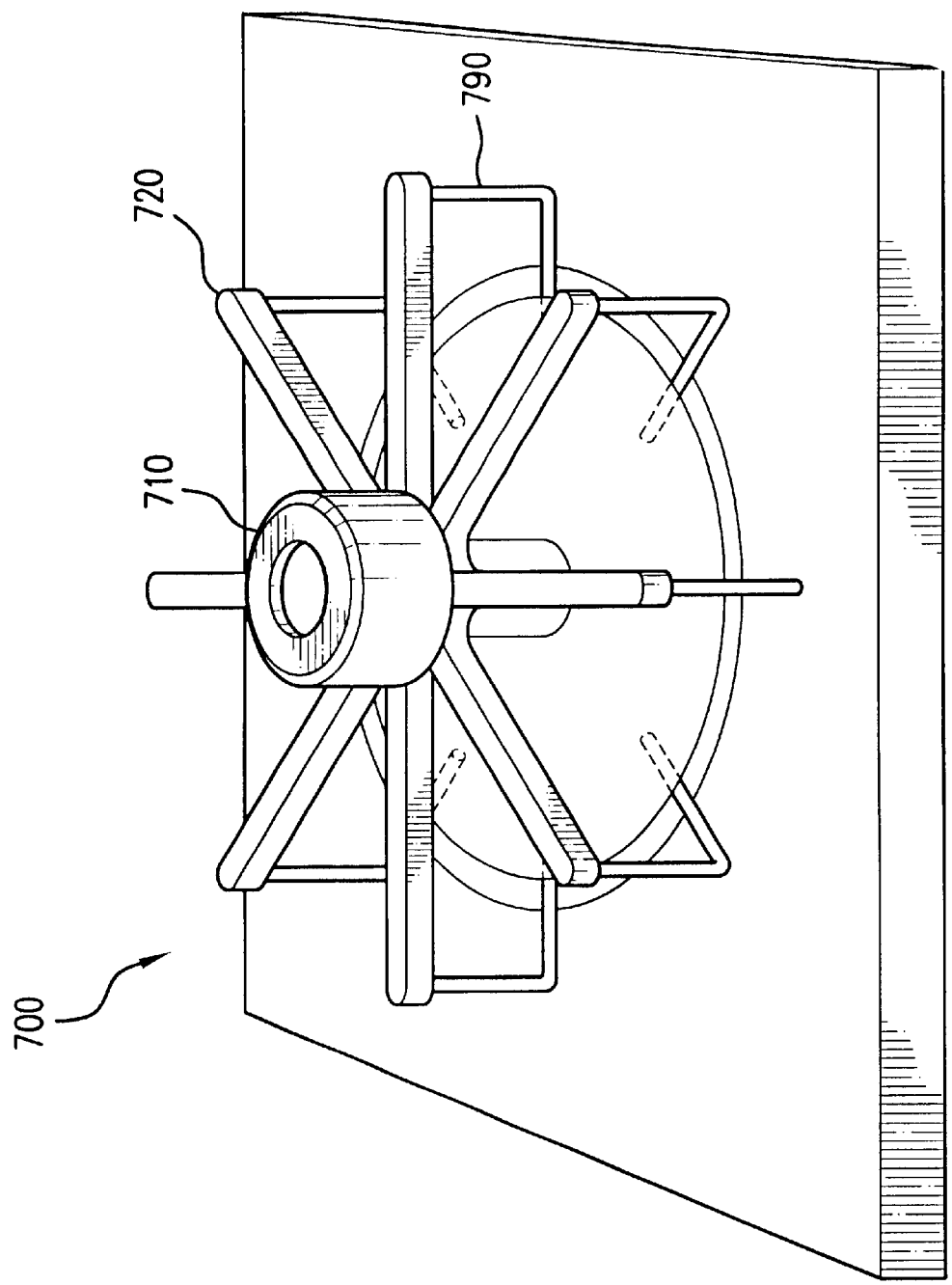
FIG. 19 is a perspective view of yet another alternative embodiment of the lifting device.

FIG. 19 provides a perspective view of another alternative embodiment wherein the spooled fibers can be lifted from above by a lifting device 700 that can have a plurality of lifters 720 that extend radially from a wheel 710. The lifters 720 can include releasable lifting slings (not shown) or hooks 790 that can extend beneath the bottommost fiber.

Still other advantages and embodiments of the lifters will become readily apparent to those skilled in this art from the above-recited detailed description. Accordingly, the drawings and descriptions are to be regarded as illustrative in nature, and not as restrictive. For example, the plurality of lifters can include any number of lifters (greater than one).

The Secluder

Embodiments of the secluder are described in "Device for Segregating Optical Fibers", Ser. No. 09/317,826, filed May 25, 1999, which is incorporated by reference.

Embodiments of the secluder can segregate a plurality of fibers coiled within a space defined by a restrainer. The secluder can be adapted to be bound by the restrainer. The secluder can lack a sealer.

Definitions Pertinent to the Secluder

As used herein, the term "segregating" can include segregating, secluding, separating, isolating, or dividing such that none of the fibers is in direct contact with any other.

As used with the term "secluder", the term "fiber" can include any type of fiber in any system or component, provided that the fiber is spooled around a spooling axis. For example, the fiber can be an optical fiber such as that used in a submarine optical repeater or branching station.

As used herein, the term "restrainer" can include any type of device or combination of devices that define a space and restrain the fibers coiled within the space from straightening.

As used herein, the term "secluder" can include any type of device or combination of devices that seclude, separate, segregate, isolate, or divide a plurality of fibers from each other.

As used herein, the term "perimeter" can include any boundary.

As used herein, the term "sealer" can include any device or combination of devices that attach one secluder to another along at least a portion of their perimeters. For example, a sealer can be a sealing flap that is connected to one side of a square secluder and that is adapted to be folded and adapted to engage with a sealing zone bordering a corresponding side of another square secluder. As another example, a sealer can be a plurality of tabs connected to the inner circumference of a secluder and adapted to engage with a plurality of corresponding sealing zones bordering the inner circumference of another secluder. Alternatively, a sealer can be a sealing zone along one side of a square secluder that is adapted to receive a sealing flap or sealing tab that is connected to a corresponding side of another square secluder. Thus, the sealer can be a sealing flap, a sealing tab, or a sealing zone located along any perimeter of a secluder. Moreover, the sealer can include an adhesive.

Detailed Description of the Secluder

Figure 20:
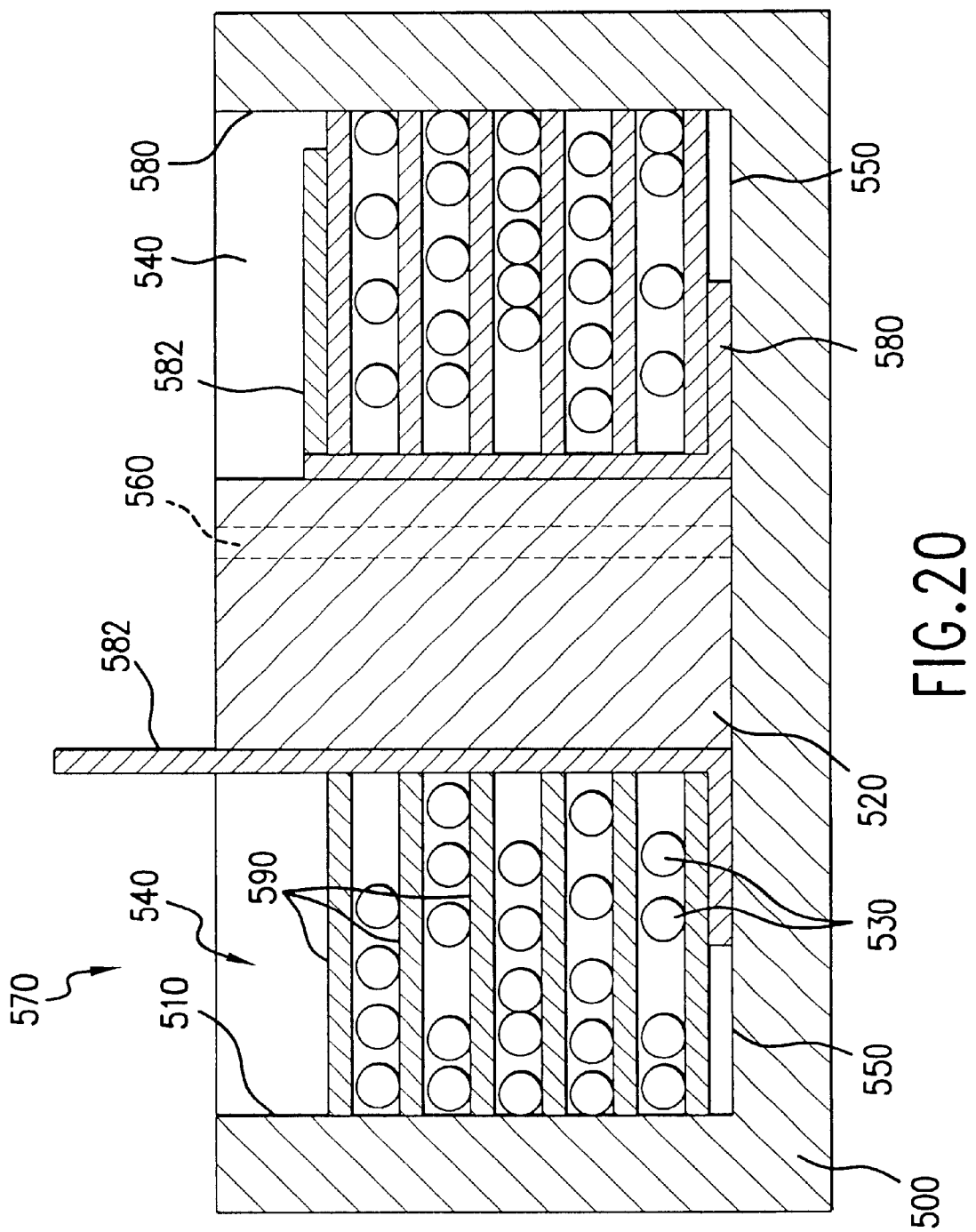
FIG. 20 is a cross-sectional view of an embodiment of a secluder system.

Embodiments of the fiber storage assembly of the present invention can include a secluder. FIG. 20 provides a cross-sectional view of an embodiment of a secluder system 570, which can work in conjunction with a fiber storage tray 500 having a well 510 that extends partially through the thickness of tray 500. Attached to tray 500 and surrounded by well 510 can be at least one elongated generally circular spool 520 around which each fiber 530 can be spooled. The placement of spool 520 within well 510 can define an elongated annular fiber storage space 540 and an annular fiber-supporting surface 550.

Spool 520 can define at least one alignment groove 560 extending longitudinally along its outer circumference. In alternative embodiments (not shown), an alignment groove can extend longitudinally along the inner circumference of well 510, or can be located in fiber-supporting surface 550, or can be replaced by an alignment aperture, which can be an opening, hole, gap, or slit.

Secluder system 570 can be adapted to be slidably received around spool 520, and can comprise a bottom 580 and at least one secluder 590. Bottom 580 can be constructed of a white opaque fibrous paper, such as that bearing the TYVEK® brand. Secluder 590 can be constructed of a transparent plastic material, such as acrylic. Neither bottom 580 nor secluder 590 include sealers.

Bottom 580 can be adapted to rest on fiber-supporting surface 550 within well 510. Bottom 580 can have a generally flat and annular shape. To allow bottom 580 to surround spool 520, the inner diameter of bottom 580 can be no smaller than the outer diameter of spool 520. To allow bottom 580 to be slidably received within well 510, the outer diameter of bottom 580 can be no larger than the inner diameter of well 510. Thus, the difference between the outer diameter and the inner diameter of bottom 580, i.e., the annular width of bottom 580, can be approximately equal to, or significantly less than the annular width of fiber storage space 540.

Figure 21:
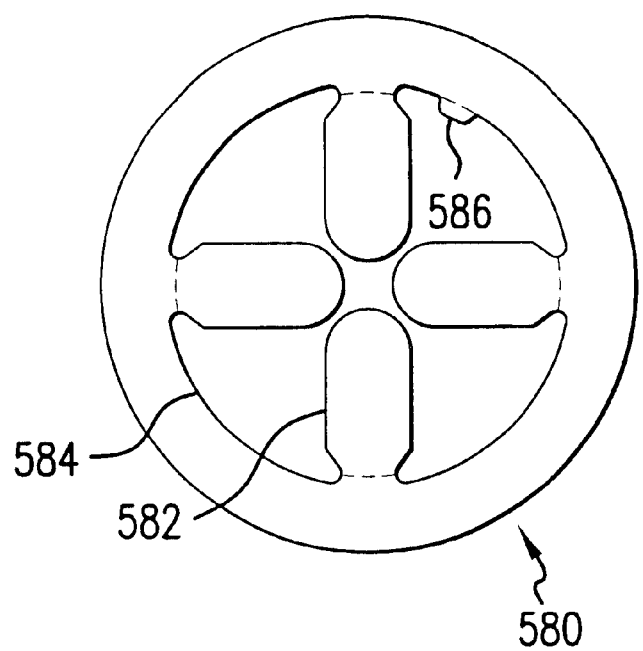
FIG. 21 is a top view of an embodiment of a bottom of the secluder system shown in FIG. 20.

FIG. 21 provides a top view of bottom 580. Referring to FIG. 21, bottom 580 can include at least one, and is shown with four, foldable inner tabs 582 attached to its inner circumference 584. Although inner tabs 582 are shown as equally circumferentially distributed around the inner circumference 584, this is not necessary. Moreover, although not required, envelope bottom can include at least one alignment tab 586 attached to its inner circumference 584. Alignment tab 586 can be adapted to slidably engage with any of the at least one alignment grooves 560 in spool 520, thereby preventing bottom 580 from rotating around spool 520. In alternative embodiments (not shown), an alignment tab attached to bottom 580 can be adapted to slidably engage with an alignment aperature (not shown) in spool 520, or in well 510, or in fiber-supporting surface 550.

Figure 22:
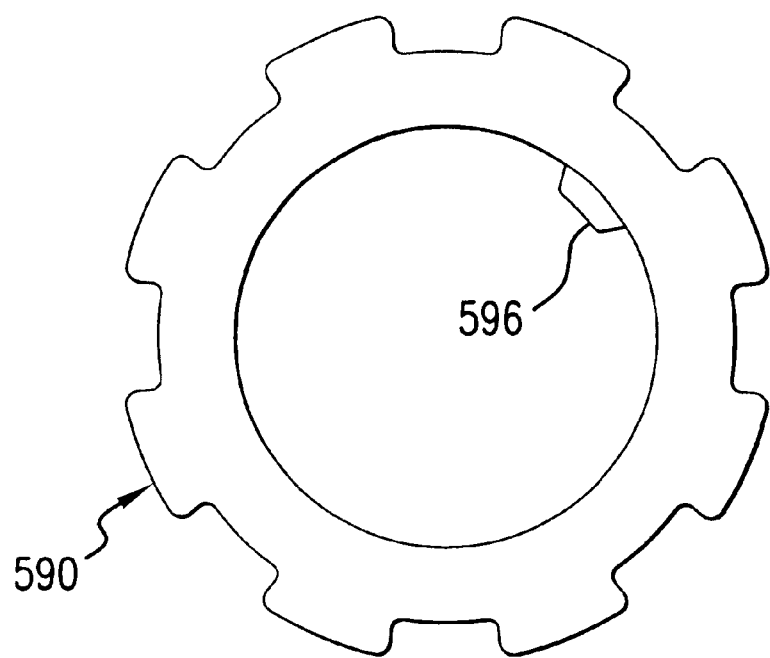
FIG. 22 is a top view of an embodiment of a secluder of the secluder system shown in FIG. 20.

FIG. 22 provides a top view of secluder 590. Referring to FIG. 22, secluder 590 can be generally flat and annular. To allow secluder 590 to slidably surround spool 520 (not shown in FIG. 22), the inner diameter of secluder 580 can not be smaller than the outer diameter of spool 520. To allow secluder 590 to be slidably received within well 510 (not shown in FIG. 15), the outer diameter of secluder 590 can not be larger than the diameter of well 510. Thus, the annular width of secluder 590 can approximate the annular width of fiber storage space 540 (not shown in FIG. 22). However, the annular width of secluder 590 can be significantly less than the annular width of fiber storage space 540.

Although not required, secluder 590 can also include at least one alignment tab 596. When provided, alignment tab 596 can be adapted to slidably engage with an alignment groove (not shown) in spool 520 (not shown in FIG. 22), thereby preventing secluder 590 from rotating around spool 520. In alternative embodiments (not shown), an alignment tab attached to secluder 590 can be adapted to slidably engage with an alignment aperature in spool 520 or in well 510.

The operation of secluder system 570 will now be described. Referring again to FIG. 20, secluder system 570 can be assembled by placing bottom 580 within well 510, with its inner tabs 582 folded-up so they extend along the outer wall of spool 520. Bottom 580 can be pushed down into well 510 until bottom 580 rests upon fiber-supporting surface 550. Then, a first secluder 590 can be placed over spool 520 and pushed down into well 510, leaving inner tabs 582 extended along the outer wall of spool 520. Fiber 530 can then be spooled around spool 520 and on top of first secluder 590. Afterwards, a second secluder 590 can be placed over spool 520 and pressed gently down into well 510, again leaving inner tabs 582 extended along the outer wall of the spool 520. Then, a second fiber 530 can be spooled around spool 520 and on top of second secluder 590. This process of placing a secluder 590 and spooling a fiber 530 can be repeated until all the desired fibers 530 have been spooled.

After the last fiber 530 is spooled, the resulting stack can be capped by placing a topmost secluder 590 over spool 520 and pushing it gently down into well 510. Then inner tabs 582 can be folded over topmost secluder 590, and away from spool 520, thereby completing secluder system 570.

To access a fiber or splice within secluder system 570, the process can be reversed. Specifically, inner tabs 582 can be folded up so that the topmost secluder 590 can be removed. Inner tabs 582 can be pulled upwards to pull bottom 580 upwards and move the stack of fibers toward the top of well 510, thereby making the topmost fiber 530 or secluder 590 more accessible. Fibers 530 and secluders 590 can be removed as necessary and placed safely aside, thereby allowing access to the fiber or splice of interest. If desired, a fiber 530 can be temporarily fastened to its supporting secluder 590 using tape, so that fiber 530 and secluder 590 can be removed as a unit, thereby alleviating the need to unwind and rewind fiber 530.

In an alternative mode of operation (not shown), no secluder 590 is placed directly on top of the bottom 580, but instead, the first fiber 530 can be spooled directly on top of the bottom 580. In another alternative mode of operation (not shown), no secluder 590 is placed directly on top of the topmost fiber 530, but instead, inner tabs 582 can be folded directly over the topmost fiber 530.

Advantages of the Described Embodiments of the Secluder

The advantages of the shown embodiment of the invention are numerous. For example, a bare fiber or splice can be less likely to be damaged when constructing secluder system 570, because no need exists to press down upon the stack of fibers to cause sealing flaps or sealing tabs to stick to sealing zones. Furthermore, a bare fiber or splice can be less likely to be damaged when disassembling secluder system 570, because no need exists to pry flaps or tabs to release the hold of an adhesive. Moreover, because no adhesive is involved in constructing it, secluder system 570 can be more easily and more efficiently assembled, disassembled, and reassembled.

Because secluder system 570 can eliminate the flaps of the known multi-envelope assemblies, well 510 can be circular. Providing a well 510 that is circular can maximize the number of potential entry points for fiber 530 into well 510, and can increase the potential geometries of the storage tray.

Because secluder system 570 can include inner tabs 582, the folding of tabs 582 over the topmost secluder 590 and away from spool 520 can substantially prevent a fiber 530 stored within well 510 from laying across the top of spool 520 where that fiber 530 could be crushed by the tray top. Preventing each fiber 530 from laying across the top of spool 520 can also substantially prevent a corresponding violation of the reliability-adjusted minimum bending radius of each fiber 530.

Because each of secluders 590 can be transparent, a splice in a bare portion of a fiber 530 can be located with relative ease before removing the secluder 590 covering that splice. Moreover, because each of secluders 590 can be transparent, an assembler can detect if a fiber 530 has been routed across the top of spool 520, and take corrective action.

Because secluder system 570 can include less components, the costs of purchasing, storing, and assembling those components can be substantially reduced. Moreover, each of the components of secluder system 570 can be reusable, thereby further lowering costs.

Alternative Embodiments of the Secluder

Moreover, there are a number of alternative embodiments of the invention. For example, the restrainer can include any device or combination of devices that define a space and an inner bearing surface, which restrains the fiber coiled within the space from straightening. The space defined by the restrainer can take nearly any shape. Moreover, the restrainer itself can be a single device, such as an annulus, or can be a plurality of devices, such as arms or fingers. Also, the restrainer can be adapted to extend perpendicular to a base or to extend merely generally away from a base. Thus, the inner bearing surface defined by the restrainer can be one or more points, segments, lines, curves, or areas, or any combination thereof. In addition, the inner bearing surface can be continuous, or can have interruptions. Therefore, there are a number of alternative embodiments for the restrainer.

In one embodiment, the restrainer can be a well defined within a tray. Such a well can be any shape, including an elongated circle. Alternatively, the restrainer can be an elongated annulus attached to a base. In another alternative embodiment, the restrainer can comprise one or more arms or posts generally extending away from the base. In all these cases, the restrainer can prevent a fiber coiled about the spool from straightening by uncoiling.

Likewise, the spool can include any device or combination of devices defining at least one outer bearing surface about which a portion of the fiber coiled within the restrainer can be spooled such that any curvature formed in the fiber meets or exceeds the fiber's reliability-adjusted minimum bending radius. Thus, there are a number of alternative embodiments for the spool. For example, an outer perimeter defined by the spool can be continuous, or can have interruptions. In addition, the outer perimeter defined by the spool can be circular or polygonal. Moreover, the spool can be a single device, such as an annulus, or can be a plurality of devices, such as arms or fingers. Furthermore, the spool can be adapted to extend perpendicular to the tray or to extend merely generally away from the tray. Thus, either the outer bearing surface of the spool can be one or more points, segments, lines, curves, or areas, or any combination thereof.

Still other advantages and embodiments of the secluder will become readily apparent to those skilled in this art from the above-recited detailed description. Accordingly, the drawings and descriptions are to be regarded as illustrative in nature, and not as restrictive. For example, although not shown, the secluder can have an polygon-shaped outer perimeter, even if the well is circular. Moreover, the secluder can have a polygon-shaped inner perimeter, even if the spool is circular.

The Tray Assembly

Figure 23:
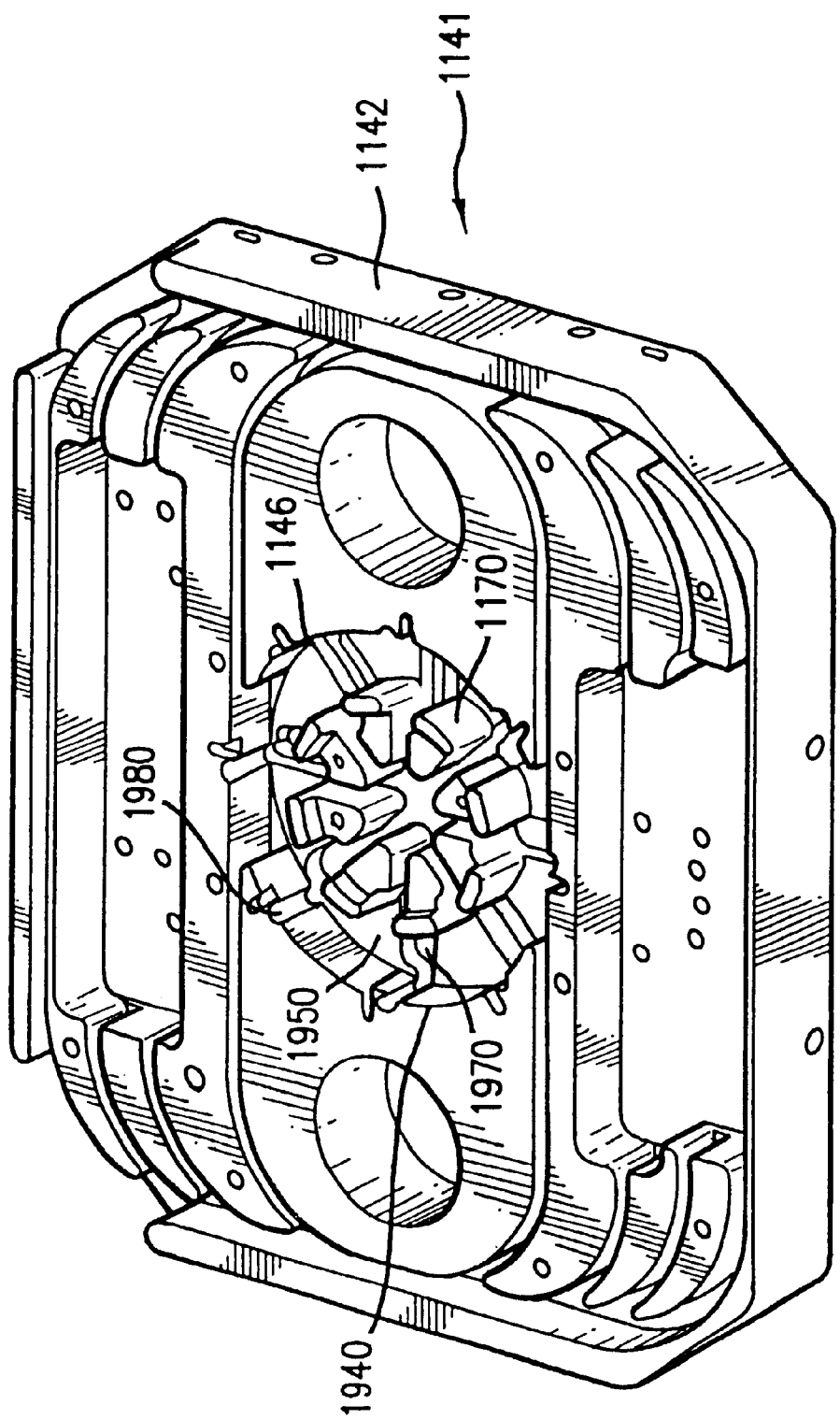
FIG. 23 is a perspective view of an embodiment of a tray assembly with which the present invention can be utilized.

The fiber storage assembly of the present invention can be used in conjunction with a tray assembly. FIG. 23 provides a perspective view of an embodiment of a tray assembly 1141. Tray 1142 accomodates separator assembly 140 identically to tray 142 of FIG. 8. However, unlike tray 142 of FIG. 8, tray 1142 can also accomodate lifting device 300 (as illustrated in FIG. 15 but not shown in FIG. 23). Either tray 1142 or tray 142 of FIG. 8 can accomodate secluder system 570 (as illustrated in FIG. 20 but not shown in FIG. 23).

Tray 1142 can define an elongated generally circular fiber storage well 1146. Elongated generally annular spool 1170 can be formed as an integral part of tray 1142 within the circumference of fiber storage well 1146. Alternatively, elongated generally annular spool 1170 can be formed separate from tray 1142 and can be connected to tray 1142. Spool 1170 and tray 1142 can be constructed of, for example, aluminum. Alternatively, spool 1170 and tray 1142 can be constructed of any material, including, but not limited to, metals, metallic alloys, plastics, rubbers, ceramics, woods, or composite materials. The outer radius of spool 1170 can at least meet the reliability-adjusted minimum bending radius of any bare fibers (not shown) coiled thereabouts.

The accomodation of lifting device 300 (not shown in FIG. 23) within tray 1142 can be achieved by modifying tray 142 (shown in FIG. 8) to include arm recesses 1970 that can extend through spool 1170 and base 1950 of well 1146 to accomodate the length of lifter arms 320 (not shown in FIG. 23). Tray 142 can also be modified to include tip recesses 1980 in the inner walls 1940 of well 1146 to accomodate the tips of lifter arms 320 (not shown in FIG. 23). Moreover, an aperture (not shown in FIG. 23) can be included in spool 1170 to accomodate wheel 310 (not shown in FIG. 23).

Thus, tray assembly 1141 can be utilized in conjunction with the following components (not shown in FIG. 23): separator assembly 140, lifting device 300, and secluder system 570.

The Fiber Storage Assembly

Embodiments of the present invention can provide a device for storing at least one fiber. Each of the embodiments of the present invention can include embodiments of at least two of the following components: a separator, a plurality of lifters, and a secluder.

Figure 24:
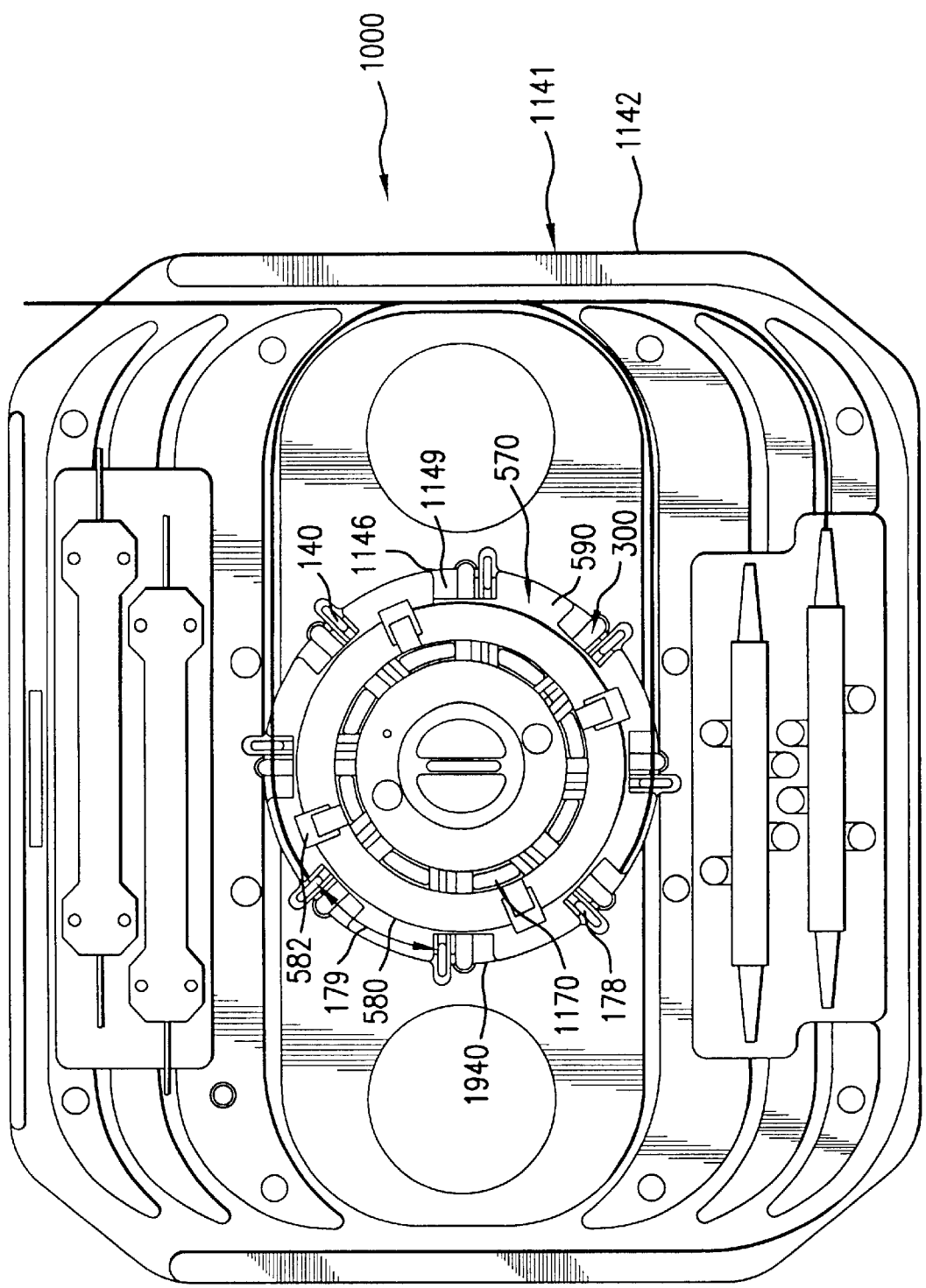
FIG. 24 is a top view of an embodiment of the present invention as utilized with the tray assembly of FIG. 23.

FIG. 24 provides a top view of an embodiment of a fiber storage assembly of the present invention. Referring to FIG. 24, fiber storage assembly 1000, which can include separator assembly 140 (also shown in FIG. 9), lifting device 300 (also shown in FIG. 15), and secluder system 570 (also shown in FIG. 20), can be utilized in conjunction with tray assembly 1141 (also shown in FIG. 23).

Notably, secluder 590 can extend from very near spool 1170 to very near the inner wall 1940 of well 1146 by extending around separator arms 178 and through separator openings 179. Thus, secluder 590 can provide a mechanism for segregating jacketed portions as well as bare portions of a fiber.

Referring to FIG. 24, the operation of the illustrated embodiment of fiber storage assembly 1000 can begin by raising separator device 140 to a first separator position and locking it in this position. Also, lifting device 300 can be raised parallel to the spooling axis to a first lifting position, which can be generally at or near the top of well 1146. Lifting device 300 can be locked into this position to prevent its movement. The inner tabs 582 of bottom 580 can be folded perpendicular to bottom 580. Then, bottom 580 can be placed around spool 1170 and within space 1149 defined by well 1146, such that tabs 582 extend longitudinally upward along spool 1170 and away from tray 1142. Secluder 590 can then be placed around spool 1170 and within space 1149, such that tabs 582 of bottom 580 continue to extend longitudinally along spool 1170 and away from tray 1142. Then, as described earlier when describing separator 178, a bare portion of a fiber can be coiled within separator 178, and a jacketed portion of a fiber can be coiled around separator 178, with the fiber passing through the separator opening at or near the junction of the two portions. This coiling can be such that tabs 582 continue to extend longitudinally along spool 1170 and away from tray 1142. The bare portion can be spread, or distributed, across secluder 590, so that it does not bunch or tangle, and so that it can occupy as little vertical space as possible. Another secluder 590 can then be placed around spool 1170 and within space 1149, such that tabs 582 of bottom 580 continue to extend longitudinally along spool 1170 and away from tray 1142. As desired, lifting device 300 can be gradually lowered to allow additional fibers and secluders to be added to the stack using the above procedure. When the last fiber has been spooled and capped with a secluder 590, separator device 140 can be lowered to prevent the jacketed portions from springing out and away from their storage area, and thereby uncoiling. Tabs 582 can be folded away from spool 1170 to prevent a bare portion from spring out and away from its storage area, and thereby uncoiling. Lifting device 300 can be lowered to its bottommost position.

ADVANTAGES OF THE DESCRIBED EMBODIMENT OF THE FIBER STORAGE ASSEMBLY

There are at least several advantages to combining the separator with the secluder. For example, compared to using the separator alone, this combination can prevent a jacketed portion from tangling or knotting with another jacketed portion. Likewise, this combination can prevent a bare portion from tangling or knotting with another bare portion. Compared to using the secluder alone, this combination can prevent the jacketed portion from popping out of the storage area or a channel when an assembler is winding a bare portion.

There are also at least several advantages to combining the plurality of lifters with the secluder. One advantage is that, compared to using the secluder alone, this combination can allow a bare fiber to be spread horizontally on the secluder before bare fiber is lowered into the storage space. Also, this combination can minimize the effort involved in keeping the secluder's tabs in the correct position along the spool. Moreover, this combination can allow the secluder to be more easily removed from the storage space. Compared to using the plurality of lifters alone, this combination can allow the force applied to the plurality of lifters to be spread across a larger surface of the bottommost fiber, thereby potentially minimizing the stress applied by the plurality of lifters to the bottommost fiber. Furthermore, when using the embodiment where the plurality of lifters extend through the tray, this combination can allow a bare fiber to be positioned anywhere within its section of the storage space rather than requiring the bare fiber to be positioned directly over each lifter.

Similarly, there are at least several advantages to combining the separator with the lifter. For example, compared to using the separator alone, this combination can allow a bare fiber to be lowered gently into the storage space. Also, this combination can make it easier for an assembler to grasp a desired portion of fiber. Compared to using the lifter alone, this combination can prevent the jacketed portion from popping out of the storage area or a channel when the lifter is raised or when an assembler is winding a bare portion.

Finally, there are at least several advantages to combining the separator, the plurality of lifters, and the secluder. For example, this combination can allow a jacketed portion to be kept on the same horizontal elevation as its corresponding bare portion, thereby allowing both portions to be moved together vertically. This synchronous movement can prevent stressing the junction of the two portions when either portion is moved vertically.

Still other advantages and embodiments of the fiber storage assembly will become readily apparent to those skilled in this art from the above-recited detailed description. Accordingly, the drawings and descriptions are to be regarded as illustrative in nature, and not as restrictive. For example, any number of secluders can be used with the present invention.

What is claimed is:

1. A device for storing a plurality of fibers within a space defined by a restrainer, each fiber from said plurality of fibers having a first fiber portion and a second fiber portion, comprising:
   a separator defining at least one inner bearing surface adapted to restrain each first fiber portion from straightening when coiled within said separator;
   said separator defining at least one outer bearing surface adapted to limit a path defined by each second fiber portion when coiled on said separator, each path varying with a longitudinal tension in the second fiber portion, each path having a plurality of curves each having a radius, the radius of each curve of each path at least meeting a reliability-adjusted minimum bending radius of the second fiber portion;
   said separator defining a plurality of separator openings adapted for passing each fiber therethrough; and
   a secluder adapted to be bound by the restrainer and at least partially received within said separator, for secluding at least one layer of said fibers in the restrainer.

2. The device of claim 1, wherein said secluder lacks a sealer.

3. The device of claim 1, wherein said secluder is transparent.

4. The device of claim 1, wherein said secluder is adapted to extend through said at least one separator opening.

5. The device of claim 1, wherein said separator is generally annular.

6. The device of claim 1, wherein said separator is elongated and has a longitudinal axis.

7. The device of claim 1, wherein said separator includes a plurality of separator arms.

8. The device of claim 1, wherein said separator is elongated, has a longitudinal axis, and includes a plurality of separator arms distributed about said longitudinal axis.

9. The device of claim 1, wherein said separator is elongated, has a longitudinal axis, and includes a plurality of separator arms distributed concentrically about said longitudinal axis.

10. The device of claim 1, further comprising a generally annular retainer connected to and surrounding said separator.

11. The device of claim 1, further comprising a generally annular retainer connected to and surrounding said separator, wherein said retainer defines at least one retainer opening that corresponds with said at least one separator opening.

12. The device of claim 1, wherein said separator is adapted to be bounded by a restrainer.

13. The device of claim 1, further comprising a generally annular retainer connected to and surrounding said separator, wherein said separator is adapted to be bounded by a restrainer, and said retainer generally overlaps the restrainer.

14. The device of claim 1, further comprising a generally annular retainer connected to and surrounding said separator, wherein said retainer is adapted to be releasably received in a retainer recess defined in a base.

15. The device of claim 1, further comprising a generally annular retainer connected to and surrounding said separator, wherein said retainer is adapted to be releasably received in a retainer recess defined in a restrainer.

16. The device of claim 1, further comprising a generally annular retainer connected to and surrounding said separator, wherein said retainer defines at least one retainer opening that corresponds with said at least one separator opening, wherein said retainer is receivable in a retainer recess defined in the restrainer, and wherein said retainer recess is interrupted by at least one ridge that corresponds with said at least one retainer opening.

17. The device of claim 1, further comprising a hub connected to said separator.

18. The device of claim 1, further comprising a hub connected to said separator by at least one hub connector.

19. The device of claim 1, further comprising a hub connected to said separator, said hub defining an outer hub perimeter that is smaller than an outer spool perimeter defined by a spool.

20. The device of claim 1, further comprising an elongated generally annular hub connected to said separator by a plurality of connector arms, wherein a spool slidably and concentrically surrounds said hub.

21. The device of claim 1, further comprising a hub connected to said separator by a plurality of connector arms, wherein said separator includes a plurality of separator arms attached to said plurality of connector arms in a one-to-one correspondence.

22. The device of claim 1, further comprising a hub connected to said separator by a plurality of connector arms, said hub adapted to be slidably and concentrically surrounded by a spool attached to a base that includes a plurality of connector arm recesses that correspond in a one-to-one manner with said plurality of connector arms, wherein each of said connector arm recesses is adapted to surround its corresponding connector arm.

23. The device of claim 1, wherein said separator includes a plurality of separator arms, wherein said separator is surrounded by and connected to a plurality of retaining arms attached to said plurality of separator arms in a one-to-one correspondence.

24. The device of claim 1, further comprising a hub connected to said separator, wherein said separator is adapted to be moved perpendicular to a base supporting said separator, and said separator is adapted to be limited in its movement toward the base by said hub bearing upon the base.

25. The device of claim 1, further comprising a hub connected to said separator, wherein said separator is adapted to be moved perpendicular to a base supporting said separator, and said separator is adapted to be limited in its movement away from the base by said hub bearing upon a plurality of headed screws extending through a one-to-one corresponding plurality of unthreaded holes in said hub and adjustably threading into a one-to-one corresponding plurality of threaded holes in the base, whereby, the distance of the screw heads from the base determines the movement distance of said separator from the base.

26. The device of claim 1, further comprising a handle adapted to releasably connect to said separator.

27. The device of claim 1, wherein said secluder is adhesive-free.

28. The device of claim 1, wherein said secluder defines an inner perimeter adapted to bound a spool.

29. The device of claim 1, wherein an alignment tab is attached to said secluder.

30. The device of claim 1, wherein said secluder defines an outer circumference.

31. The device of claim 1, wherein an alignment tab is attached to said secluder, said alignment tab adapted to engage in an alignment aperature.

32. The device of claim 1, wherein an alignment tab is attached to said secluder, said alignment tab adapted to engage in an alignment aperature in a spool.

33. A device for storing a plurality of fibers coiled about a spooling axis and within a space defined by a restrainer, each fiber from said plurality of fibers having a first fiber portion and a second fiber portion, comprising:
   a separator defining at least one inner bearing surface adapted to restrain each first fiber portion from straightening when coiled within said separator;
   said separator defining at least one outer bearing surface adapted to limit a path defined by each second fiber portion when coiled on said separator, each path varying with a longitudinal tension in the second fiber portion, each path having a plurality of curves each having a radius, the radius of each curve of each path at least meeting a reliability-adjusted minimum bending radius of the second fiber portion;
   said separator defining at least one separator opening adapted for passing each fiber therethrough;
   a plurality of lifters adapted to be disposed beneath at least a bottom-most fiber from said plurality of fibers and adapted to be movable parallel to the spooling axis; and
   a secluder adapted to be bound by the restrainer, for secluding at least one layer of said fibers coiled around the spooling axis within the space defined by the restrainer.

34. The device of claim 33, wherein said secluder lacks a sealer.

35. The device of claim 33, wherein said secluder is transparent.

36. The device of claim 33, wherein said secluder is adapted to extend through said at least one separator opening.

37. The device of claim 33, wherein said separator is generally annular.

38. The device of claim 33, wherein said separator is elongated and has a longitudinal axis.

39. The device of claim 33, wherein said separator is elongated, has a longitudinal axis, and is movable along its longitudinal axis.

40. The device of claim 33, wherein said separator includes a plurality of separator arms.

41. The device of claim 33, wherein said separator is elongated, has a longitudinal axis, and includes a plurality of separator arms distributed about said longitudinal axis.

42. The device of claim 33, wherein said separator is elongated, has a longitudinal axis, and includes a plurality of separator arms distributed concentrically about said longitudinal axis.

43. The device of claim 33, further comprising a generally annular retainer connected to and surrounding said separator.

44. The device of claim 33, further comprising a generally annular retainer connected to and surrounding said separator, wherein said retainer defines at least one retainer opening that corresponds with said at least one separator opening.

45. The device of claim 33, wherein said separator is adapted to be bounded by a restrainer.

46. The device of claim 33, further comprising a generally annular retainer connected to and surrounding said separator, wherein said separator is adapted to be bounded by a restrainer, and said retainer generally overlaps the restrainer.

47. The device of claim 33, further comprising a generally annular retainer connected to and surrounding said separator, wherein said retainer is adapted to be releasably received in a retainer recess defined in a base.

48. The device of claim 33, further comprising a generally annular retainer connected to and surrounding said separator, wherein said retainer is adapted to be releasably received in a retainer recess defined in a restrainer.

49. The device of claim 33, further comprising a generally annular retainer connected to and surrounding said separator, wherein said retainer defines at least one retainer opening that corresponds with said at least one separator opening, wherein said retainer is receivable in a retainer recess defined in the restrainer, and wherein said retainer recess is interrupted by at least one ridge that corresponds with said at least one retainer opening.

50. The device of claim 33, further comprising a hub connected to said separator.

51. The device of claim 33, further comprising a hub connected to said separator by at least one hub connector.

52. The device of claim 33, further comprising a hub connected to said separator, said hub defining an outer hub perimeter that is smaller than an outer spool perimeter defined by a spool.

53. The device of claim 33, further comprising an elongated generally annular hub connected to said separator by a plurality of connector arms, wherein a spool slidably and concentrically surrounds said hub.

54. The device of claim 33, further comprising a hub connected to said separator by a plurality of connector arms, wherein said separator includes a plurality of separator arms.

55. The device of claim 33, further comprising a hub connected to said separator by a plurality of connector arms, wherein said separator includes a plurality of separator arms attached to said plurality of connector arms in a one-to-one correspondence.

56. The device of claim 33, further comprising a hub connected to said separator by a plurality of connector arms, said hub adapted to be slidably and concentrically surrounded by a spool attached to a base that includes a plurality of connector arm recesses that correspond in a one-to-one manner with said plurality of connector arms, wherein each of said connector arm recesses is adapted to surround its corresponding connector arm.

57. The device of claim 33, wherein said separator includes a plurality of separator arms, wherein said separator is surrounded by and connected to a plurality of retaining arms attached to said plurality of separator arms in a one-to-one correspondence.

58. The device of claim 33, further comprising a hub connected to said separator, wherein said separator is adapted to be moved perpendicular to a base supporting said separator, and said separator is adapted to be limited in its movement toward the base by said hub bearing upon the base.

59. The device of claim 33, further comprising a hub connected to said separator, wherein said separator is adapted to be moved perpendicular to a base supporting said separator, and said separator is adapted to be limited in its movement away from the base by said hub bearing upon a plurality of headed screws extending through a one-to-one corresponding plurality of unthreaded holes in said hub and adjustable threading into a one-to-one corresponding plurality of threaded holes in the base, whereby, the distance of the screw heads from the base determines the movement distance of said separator from the base.

60. The device of claim 33, further comprising a handle adapted to releasably connect to said separator.

61. The device of claim 33, wherein said plurality of lifters are adapted to be distributed around said spooling axis.

62. The device of claim 33, wherein said plurality of lifters are adapted to be equally distributed around said spooling axis.

63. The device of claim 33, further comprising a wheel attached to said plurality of lifters.

64. The device of claim 33, further comprising an elongated annular wheel attached to said plurality of lifters.

65. The device of claim 33, wherein said plurality of lifters extend radially from a rim.

66. The device of claim 33, further comprising a wheel attached to said plurality of lifters, wherein said wheel is adapted to releasably receive a handle.

67. The device of claim 33, wherein said plurality of lifters are adapted to correspond in a one-to-one manner with a plurality of recesses defined in a base.

68. The device of claim 33, wherein said plurality of lifters are adapted to correspond in a one-to-one manner with a plurality of holes defined in a base.

69. The device of claim 33, further comprising a wheel attached to said plurality of lifters, said wheel adapted to be releasably supported by a base, and a locking device attached to said wheel and adapted to be releasably engaged with the base.

70. The device of claim 33, wherein each of said plurality of lifters is adapted to be slidably through a corresponding one of a plurality of base holes defined by a base.

71. The device of claim 33, further comprising a plate attached to said plurality of lifters.

72. The device of claim 33, further comprising a plate attached to said plurality of lifters, and a rod slidably attached to said plate, said rod adapted to be aligned co-axially with the spooling axis.

73. The device of claim 33, further comprising a plate attached to said plurality of lifters, a rod slidably attached to said plate, said rod adapted to be aligned co-axially with the spooling axis, and a stop surrounding said rod.

74. The device of claim 33, further comprising a plate attached to said plurality of lifters, a rod slidably attached to said plate, said rod adapted to be aligned co-axially with the spooling axis, and a plate lock attached to said plate and releasable attached to said rod.

75. The device of claim 33, wherein said secluder is adhesive-free.

76. The device of claim 33, wherein said secluder defines an inner perimeter adapted to bound a spool.

77. The device of claim 33, wherein an alignment tab is attached to said secluder.

78. The device of claim 33, wherein said secluder defines an outer circumference.

79. The device of claim 33, wherein an alignment tab is attached to said secluder, said alignment tab adapted to engage in an alignment aperture.

80. The device of claim 33, wherein an alignment tab is attached to said secluder, said alignment tab adapted to engage in an alignment aperature in a spool.

81. A device for storing a plurality of fibers within a space defined by a restrainer, each fiber from said plurality of fibers having a first fiber portion and a second fiber portion, comprising:

a separator defining at least one inner bearing surface adapted to restrain each first fiber portion from straightening when coiled within said separator, wherein said separator is elongated, has a longitudinal axis, and is movable along its longitudinal axis;

said separator defining at least one outer bearing surface adapted to limit a path defined by each second fiber portion when coiled on said separator, each path varying with a longitudinal tension in the second fiber portion, each path having a plurality of curves each having a radius, the radius of each curve of each path at least meeting a reliability-adjusted minimum bending radius of the second fiber portion;

said separator defining at least one separator opening adapted for passing each fiber therethrough; and a secluder adapted to be bound by the restrainer and at least partially received within said separator, for secluding at least one layer of said fibers in the restrainer.

82. A device for storing a plurality of fibers within a space defined by a restrainer, each fiber from said plurality of fibers having a first fiber portion and a second fiber portion, comprising:

a separator defining at least one inner bearing surface adapted to restrain each first fiber portion from straightening when coiled within said separator;

said separator defining at least one outer bearing surface adapted to limit a path defined by each second fiber portion when coiled on said separator, each path varying with a longitudinal tension in the second fiber portion, each path having a plurality of curves each having a radius, the radius of each curve of each path at least meeting a reliability-adjusted minimum bending radius of the second fiber portion;

a hub connected to said separator by a plurality of connector arms, wherein said separator includes a plurality of separator arms;

said separator defining at least one separator opening adapted for passing each fiber therethrough; and a secluder adapted to be bound by the restrainer and at least partially received within said separator, for secluding at least one layer of said fibers in the restrainer.

83. A fiber storage device comprising:

a plurality of fibers, each fiber from said plurality of fibers having a bare fiber portion and a jacketed fiber portion;

a restrainer defining a space for storing fibers;

a separator located within said space and defining at least one inner bearing surface that restrains each bare fiber portion from straightening when coiled within the separator, said separator defining at least one outer bearing surface that limits a path defined by each jacketed fiber portion when coiled on the separator, each path varying with a longitudinal tension in the jacketed fiber portion, each path having a plurality of curves each having a radius, the radius of each curve of each path at least meeting a reliability-adjusted minimum bending radius of the jacketed fiber portion, said separator defining at least one separator opening, wherein each fiber passes therethrough; and a secluder bound by the restrainer and at least partially received within the separator, for secluding at least one layer of said fibers in said restrainer.

84. The fiber storage device of claim 83 wherein said separator includes a plurality of separator arms defining a plurality of separator openings.

85. The fiber storage device of claim 83 wherein said separator is movable along a longitudinal axis of said separator.

86. The fiber storage device of claim 83 wherein said secluder secludes both said bare fiber portion and said jacketed fiber portion of each of said fibers.

87. The fiber storage device of claim 83 further comprising a plurality of lifters disposed beneath at least a bottom-most fiber from said plurality of fibers, for moving said fibers parallel to a spooling axis.

\* \* \* \* \*